US011253990B1

(12) United States Patent
Holson et al.

(10) Patent No.: US 11,253,990 B1
(45) Date of Patent: Feb. 22, 2022

(54) ROBOT CONTROL

(71) Applicant: X Development LLC, Mountain View, CA (US)

(72) Inventors: Benjamin Holson, Sunnyvale, CA (US); Jeffrey Bingham, Sunnyvale, CA (US); Ben Berkowitz, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 283 days.

(21) Appl. No.: 16/654,658

(22) Filed: Oct. 16, 2019

Related U.S. Application Data

(63) Continuation of application No. 15/331,437, filed on Oct. 21, 2016, now Pat. No. 10,493,617.

(51) Int. Cl.
*G06F 17/00* (2019.01)
*B25J 5/00* (2006.01)
*B25J 13/08* (2006.01)
*B25J 9/16* (2006.01)

(52) U.S. Cl.
CPC ............. *B25J 5/007* (2013.01); *B25J 9/1633* (2013.01); *B25J 13/085* (2013.01); *B25J 13/088* (2013.01)

(58) Field of Classification Search
CPC ........ B25J 5/007; B25J 13/088; B25J 13/085; B25J 9/1633
USPC ........................................................ 700/254
See application file for complete search history.

(56) References Cited

U.S. PATENT DOCUMENTS

| 6,826,452 | B1 | 11/2004 | Holland et al. |
| 8,160,747 | B1 | 4/2012 | Blackwell et al. |
| 8,321,053 | B2 | 11/2012 | Ruan et al. |
| 8,419,804 | B2 | 4/2013 | Herr et al. |
| 8,442,661 | B1 | 5/2013 | Blackwell et al. |
| 9,538,696 | B2 | 1/2017 | Katupitiya et al. |
| 9,586,316 | B1 | 3/2017 | Swilling |
| 9,827,677 | B1 * | 11/2017 | Gilbertson ........... B25J 15/0014 |
| 10,493,617 | B1 * | 12/2019 | Holson .................... B25J 5/007 |
| 2005/0281661 | A1 * | 12/2005 | Kesil ...................... B25J 9/1633 414/744.5 |
| 2006/0097683 | A1 | 5/2006 | Hosoda et al. |

(Continued)

OTHER PUBLICATIONS

Kuindersma, et al. (Oct. 2011). Learning Dynamic Arm Motions for Postural Recovery. In Humanoid Robots (Humanoids), 2011 11th IEEE-RAS International Conference on (pp. 7-12). IEEE. Oct. 2011.

(Continued)

*Primary Examiner* — Ronnie M Mancho
(74) *Attorney, Agent, or Firm* — Middleton Reutlinger

(57) ABSTRACT

Methods, apparatus, and computer readable media applicable to balancing robots. Some implementations are directed to maintaining a given end effector pose (relative to a world frame) of an end effector of a balancing robot when there is a disturbance to a balancing base of the balancing robot. Some implementations are additionally or alternatively directed to transitioning a balancing robot from a fallen configuration to a balanced configuration. Some implementations are additionally or alternatively directed to mitigating the risk that a balancing robot will fall when interacting with actuable environmental objects (e.g., doors) and/or to lessen the disturbance to a balancing base when interacting with actuable environmental objects.

20 Claims, 11 Drawing Sheets

(56) References Cited

U.S. PATENT DOCUMENTS

| | | | |
|---|---|---|---|
| 2006/0243799 A1 | 11/2006 | Kelly et al. | |
| 2007/0132419 A1 | 6/2007 | Hashimoto et al. | |
| 2008/0027590 A1 | 1/2008 | Phillips et al. | |
| 2008/0105481 A1 | 5/2008 | Hutcheson et al. | |
| 2008/0140257 A1* | 6/2008 | Sato | B25J 9/1638 700/258 |
| 2010/0057319 A1 | 3/2010 | Inaji et al. | |
| 2010/0094312 A1* | 4/2010 | Morales | A61B 34/35 606/130 |
| 2010/0206651 A1 | 8/2010 | Nagasaka | |
| 2011/0071677 A1 | 3/2011 | Stilman | |
| 2011/0301757 A1 | 12/2011 | Jones et al. | |
| 2012/0215355 A1 | 8/2012 | Bewley et al. | |
| 2012/0277901 A1 | 11/2012 | Jacobsen et al. | |
| 2014/0039517 A1* | 2/2014 | Bowling | A61B 34/32 606/130 |
| 2014/0039681 A1* | 2/2014 | Bowling | B25J 13/00 700/261 |
| 2014/0222207 A1* | 8/2014 | Bowling | B25J 9/1633 700/261 |
| 2015/0127141 A1* | 5/2015 | Kawada | B25J 13/085 700/206 |
| 2015/0127158 A1* | 5/2015 | Shimodaira | B25J 9/1694 700/258 |
| 2016/0184032 A1* | 6/2016 | Romo | B25J 9/1682 606/130 |
| 2017/0008171 A1* | 1/2017 | Iwatake | B25J 9/1687 |
| 2017/0144306 A1 | 5/2017 | LaFaye et al. | |
| 2017/0333275 A1 | 11/2017 | Itkowitz et al. | |

OTHER PUBLICATIONS

Karayiannidis, et al. (Oct. 2012). "Open Sesame!" Adaptive Force/Velocity Control for Opening Unknown Doors. In 2012 IEEE/RSJ International Conference on Intelligent Robots and Systems (pp. 4040-4047). IEEE. Oct. 2012.

Stilman, et al. (May 2010). Golem Krang: Dynamically Stable Humanoid Robot For Mobile Manipulation. In Robotics and Automation (ICRA), 2010 IEEE International Conference on (pp. 3304-3309). IEEE. May 2010.

Endres, et al. (Nov. 2013). Learning The Dynamics Of Doors For Robotic Manipulation. In 2013 IEEE/RSJ International Conference on Intelligent Robots and Systems (pp. 3543-3549). IEEE. Nov. 2013.

Chan, et al. (2013). Review of Modelling and Control of Two-Wheeled Robots. Annual Reviews in Control, 37(1), 89-103. 2013.

Deegan, et al. (2006). Designing a Self-Stabilizing Robot for Dynamic Mobile Manipulation. Massachusetts Univ Amherst Dept of Computer Science. 7 pages. 2006.

Arisumi, et al. Whole-Body Motion of a Humanoid Robot for Passing Through a Door—Opening a Door by Impulsive Force—. IROS'09: International Conference on Intelligent Robots and Systems, Oct. 2009, St. Louis, MO, United States. IEEE, pp. 7, 2009. <lirrnm-00533348v1> Oct. 2009.

Ooi, R. C. (2003). Balancing a Two-Wheeled Autonomous Robot, The University of Western Australia School of Mechanical Engineering. Final Year Thesis. 72 pages. 2003.

* cited by examiner

ROBOT CONTROL

BACKGROUND

Balancing robots have a statically unstable balancing base that may take various forms, such as a balancing base that includes two axially-aligned wheels (e.g., as depicted in various figures herein), a balancing base that includes only a single wheel, or a balancing base that includes a spherical roller. Balancing robots are not statically stable and must be at least selectively actively balanced to remain upright. For example, in response to a disturbance to a balancing robot (e.g., force applied by the balancing robot and/or force applied to the balancing robot), one or more components of the robot may need to be adjusted to actively balance the robot and ensure it stays upright. In other words, in response to a disturbance, component(s) of the balancing robot are adjusted to thereby adjust the center of mass of the balancing robot so that the center of mass of the balancing robot is returned to a stabilized/balanced position (e.g., over a center point of a balancing base).

SUMMARY

This specification is directed generally to various techniques that are applicable to balancing robots, and to balancing robots that implement one or more of the various techniques. A brief overview of some implementations of the specification is provided below. The overview is described with respect to a balancing robot that includes: a balancing base, at least one robotic arm coupled (e.g., indirectly coupled) to the balancing base, and an end effector (e.g., a grasping end effector) provided at the terminal end of the robot arm.

Some implementations are directed to maintaining a given end effector pose (relative to a world frame) of the end effector when there is a disturbance to the balancing base. In some of those implementations, the configuration of the robot arm is adjusted (via arm control output provided to arm actuators of the robot arm) based on the disturbance and based on maintaining the given end effector pose. In conjunction, the balance angle of the balancing base is adjusted (via balancing base output provided to balancing base actuators that control the balancing base) based on the changes in the robot arm configuration and based on adjusting the balancing robot toward a balanced configuration.

As one example, velocity and/or displacement of the balancing base as a result of a disturbance can be provided as a feedback input in determining an adjusted arm pose that will maintain the end effector at the given end effector pose. Arm control output may be generated to adjust one or more of the arm actuators to the adjusted arm pose. The adjusted arm pose may be provided as a feedforward input in determining base compensation torque(s) to apply to actuators of the balancing base in balancing the balancing robot. Balancing base output may be generated to cause the actuators of the balancing base to apply the base compensation torque(s). The application of the base compensation torques causes further displacement of the balancing base, which may be provided as feedback input in another iteration of determining an adjusted arm pose that will maintain the given end effector pose, which may in turn be provided as feedforward input in determining base compensation torque(s). Multiple such feedback and feedforward iterations may be performed iteratively in a control loop to enable the given end effector pose to be maintained while also actively adjusting the balancing robot toward a balanced configuration.

Some implementations are additionally or alternatively directed to transitioning a balancing robot from a fallen configuration to a balanced configuration. In some of those implementations, in response to detecting the balancing robot is in a fallen configuration, arm control output may be provided to cause a robot arm of the balancing robot to apply force to a surface (e.g., the ground) to force the balancing robot out of the fallen configuration and through a plurality of configurations toward (and optionally through) a balanced configuration. In some versions of those implementations, during the transitioning through the configurations, one or more balance criteria may be monitored. In response to determining satisfaction of the balance criteria during the monitoring, balancing base output may be provided to base actuators of the balancing base. The balancing base output may cause active adjustment of one or more of the base actuators toward a balanced configuration. Awaiting satisfaction of the balance criteria before providing such balancing base output may make the transition to active adjustment toward a balanced configuration less jarring (to robotic components and/or human observer(s)) than if the balancing base output were provided prior to the satisfaction of the balance criteria.

Some implementations are additionally or alternatively directed to mitigating the risk that a balancing robot will fall when interacting with actuable environmental objects (e.g., doors) and/or to lessen the disturbance to a balancing base when interacting with actuable environmental objects. In some of those implementations, an end effector of the balancing robot may be utilized to contact an actuable object and apply a counteracting force while simultaneously applying a movement force to move the actuable object. For example, for a movement force to "push" open a door, an end effector may contact the door and apply a counteracting "downward" force to the door (via arm actuators of the robot arm), while also applying pushing force (via base actuators of the balancing base and/or via arm actuators of the robot arm). In some of those and/or in other implementations, a balancing robot may additionally or alternatively go into a counteracting out of balance state (e.g., lean forward or lean backward), in advance of a movement force, to counteract the movement force.

Some implementations are additionally or alternatively directed to selecting controller gain(s) to use in a given iteration of balancing a balancing base. In some of those implementations, the controller gain(s) may be selected based on a configuration of the balancing robot in the given iteration and/or a determined center of mass for the balancing robot in the given iteration. For example, the controller gain(s) may be selected from a plurality of candidate controller gains that are each associated with one or more corresponding centers of mass. For instance, a first controller gain may be associated with a first set of centers of mass, a second controller gain may be associated with a non-overlapping second set of centers of mass, etc. Generally, the controller gains influence the adjusted arm pose and/or base compensation torque(s) that will be determined in the given iteration.

Some implementations are additionally or alternatively directed to providing control commands to each of a plurality of actuators of a balancing base to achieve a near holonomic sidewinding movement behavior from the balancing base. For example, the balancing base may include two wheels and corresponding wheel actuators. In some of those implementations, to achieve the sidewinding movement, a first sinusoidal torque with a first phase may be provided to a first wheel actuator of the first wheel and a second sinusoidal torque, with a second phase that is offset from the first phase, may be provided to a second wheel actuator of the second wheel. For instance, the first and second sinusoidal torques may be the same frequency, but be out of phase by a small degree (e.g., out of phase by 20 degrees or less).

Additional detail on these and other implementations of the specification are described in more detail herein. Moreover, although the overview above presents various implementations separately, it is understood that combinations of the various implementations are within the scope of this specification, such as (but not limited to) combinations explicitly described in more detail herein.

In some implementations, a method is provided that includes identifying that a current end effector pose of an end effector of the balancing robot is to be maintained relative to a world frame. A robot arm pose, of a robot arm of the balancing robot, relative to the world frame is controlled in part by a plurality of arm actuators of the robot arm and in part by a balancing base of the balancing robot, and the current end effector pose of the end effector is controlled in part by the robot arm pose. The method further includes receiving data that indicates a disturbance to the balancing base of the balancing robot. The method further includes, in response to receiving the data: generating arm control output based on the data and the current end effector pose, and providing the arm control output to adjust the one or more of the arm actuators. The arm control output is generated to adjust one or more of the arm actuators to maintain the end effector in the current end effector pose in view of the disturbance to the balancing base.

This method and other implementations of technology disclosed herein may each optionally include one or more of the following features.

In some implementations, the method further includes identifying that an end effector force applied by the end effector at the current end effector pose is to be maintained. In some of those implementations, generating the arm control output is further based on the end effector force, and the arm control output is generated to maintain the end effector in the current end effector pose while applying the end effector force.

In some implementations, the data is independent of any sensors of the end effector and the method further includes: determining, based on the data, an estimated end effector force applied by the end effector; and identifying a target force to be applied by the end effector. In some of those implementations, generating the arm control output is further based on the estimated end effector force and the target force to be applied by the end effector, and the arm control output is generated to adjust one or more of the arm actuators to maintain the end effector in the current pose while applying the target end effector force.

In some implementations, the data that indicates the disturbance to the balancing base includes sensor data from one or more sensors of the robot. In some of those implementations, the one or more sensors include one or more of: an encoder coupled to a wheel of the balancing base, an inertial measurement unit, and a force-torque sensor coupled to the end effector. In some of the implementations where the one or more sensors include the encoder, the sensor data includes position data from the encoder, and generating the arm control output based on the data includes: determining, based on the sensor data, at least one of: balancing base displacement and balancing base velocity; and generating the arm control output based on the at least one of: the balancing base displacement and the balancing base velocity.

In some implementations, the data is independent of any sensors of the end effector and the method further includes: determining, based on the data, an estimated end effector force applied by the end effector.

In some implementations, the method further includes, in response to receiving the data: generating balancing base output based on the arm control output, and providing the balancing base output to adjust one or more of the base actuators. The balancing base output is generated to adjust one or more base actuators that control a base pose of the balancing base. In some of those implementations, the base actuators each drive a corresponding wheel.

In some implementations, the method further includes providing balancing base output to adjust one or more base actuators that control a base pose of the balancing base—and the data that indicates a disturbance to the balancing base of the balancing robot is received in response to implementation of the balancing base output. In some of those implementations, the balancing base output causes a first base actuator of the base actuators to generate first sinusoidal torques and causes a second base actuator of the base actuators to generate second sinusoidal torques having a second phase that is offset relative to a first phase of the first sinusoidal torques.

In some implementations, the method further includes: determining a current center of mass of the balancing robot and selecting, from a plurality of sets of candidate gains and based on the current center of mass, a set of one or more gains. Generating the arm control output may be further based on the selected set of one or more gains.

In some implementations, a method is provided that includes detecting that a balancing robot is in a fallen configuration. The method further includes, in response to detecting that the balancing robot is in the fallen configuration: providing arm control output to cause an arm of the balancing robot to apply force to a surface to force the balancing robot out of the fallen configuration and force the balancing robot to transition through a plurality of configurations; monitoring for a satisfaction of one or more balance criteria while the balancing robot is transitioning through the configurations; and in response to determining the satisfaction of the one or more balance criteria, providing balancing base output to adjust one or more base actuators toward a balanced configuration of the balancing robot. The base actuators control a base pose of the balancing base.

This method and other implementations of technology disclosed herein may each optionally include one or more of the following features.

In some implementations, the method further includes generating candidate balancing commands at each of a plurality of the configurations—and the monitoring for the satisfaction of the one or more balance criteria includes: determining whether each of the candidate balancing commands satisfies the one or more balance criteria. In some of those implementations: providing the balancing base output includes providing the candidate balancing commands that satisfy the one or more balance criteria; and during the monitoring, the candidate balancing commands that precede the balancing commands that satisfy the one or more balance criteria are not provided to adjust the base actuators. In some variations of those implementations, the satisfaction of the one or more balance criteria includes the candidate balancing commands being within a threshold value of any commands provided to the base actuators during the monitoring. For example, the balancing commands may be torque commands and no torque commands may have been provided to the base actuators during the monitoring.

In some implementations, the robot arm is not in contact with the surface during a plurality of the configurations.

In some implementations, the one or more balance criteria include criteria that indicates the balancing robot has passed through a balanced configuration while transitioning through the plurality of configurations.

In some implementations, any output generated by the base actuators when the arm control output is provided is maintained throughout the monitoring.

In some implementations, a method is provided that includes identifying a movement force to be applied, by a balancing robot, to an actuable environmental object to move the environmental object from a current pose to a modified pose. The method further includes: determining, based on the movement force to be applied, a counteracting force that counteracts the movement force; and adjusting an end effector of the balancing robot to apply the counteracting force to the actuable environmental object through contact with the actuable environmental object. The method further includes, while applying the counteracting force, applying the movement force to the actuable environmental object.

This method and other implementations of technology disclosed herein may each optionally include one or more of the following features.

In some implementations, the actuable environmental object is a door. In some of those implementations, the end effector is a grasping end effector and adjusting the end effector to contact the actuable environmental and apply the counteracting force to the actuable environmental object includes: adjusting the grasping end effector to contact a protruding member of the door and applying the counteracting force via the contact with the protruding member. The protruding member may be, for example, a handle or a knob.

In some implementations, the movement force is a pushing force and the counteracting force has a direction that is toward the ground.

In some implementations, the balancing robot is in a balanced state during at least part of the time that the counteracting force is applied to the actuable environmental object.

Other implementations may include a non-transitory computer readable storage medium storing instructions executable by at least one processor (e.g., a central processing unit (CPU) and/or graphics processing unit (GPU)) to perform a method such as one or more of the methods described above. Yet another implementation may include a system of one or more computers and/or one or more robots that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 4A:
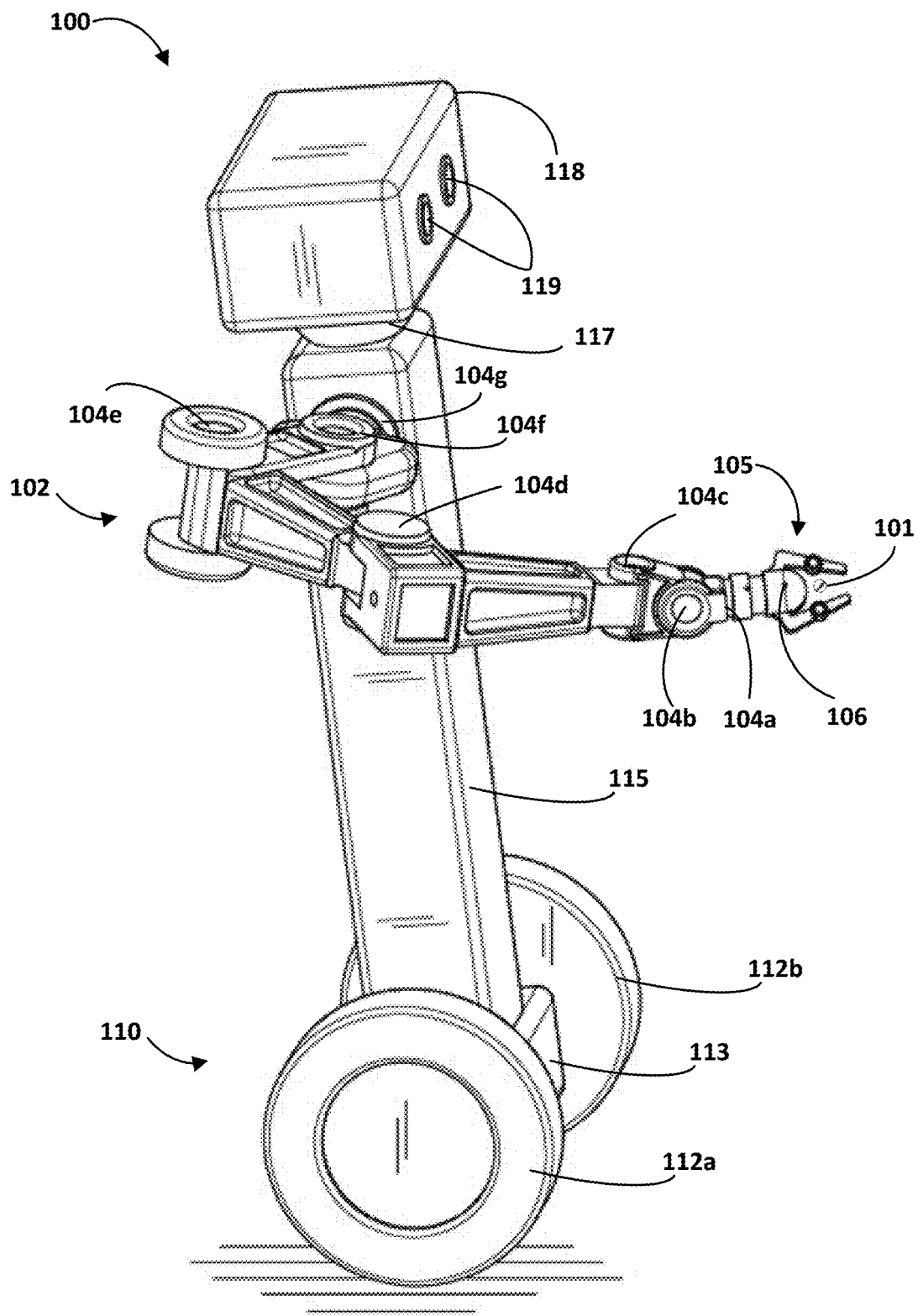
FIG. 4A illustrates the balancing robot of FIG. 1, with an end effector of the robot being in a particular end effector pose relative to a world frame.

Referring initially to FIG. 4A, an example balancing robot 100 is illustrated with detailed numbering. For the sake of simplicity, detailed numbering of the balancing robot 100 is omitted in other figures herein. The balancing robot 100 includes a balancing base 110, a torso 115 that extends upward from the balancing base 110, a robotic arm 102 coupled to the torso 115, and a head 118 that is adjustably coupled to the torso 115 via a ball and socket type joint 117.

The balancing base 110 includes two axially aligned wheels 112a and 112b and an intermediary member 113 that extends between the wheels 112a, 112b and that supports the torso 115. The head 118 includes a stereographic camera 119. The head 118 may be adjustable via the joint 117 to correspondingly adjust the pose of the stereographic camera 119. For example, the head 118 may be actively adjusted (e.g., via one or more actuators) up/down in correspondence with detected changes to the angle of the torso 115 relative to a horizontal plane. This may be beneficial to enable certain objects and/or areas to be maintained in the field of view of the stereographic camera 119 despite changes to the angle of the torso 115 relative to the horizontal plane, such as pendulum like movements of the torso 115 that may occur during active balancing of the balancing robot 100.

The robot arm 102 includes a plurality of actuators that are referenced in FIG. 4A with references 104*a-g*. As used herein, an "actuator" of a robot may refer to motors (e.g., servo motors), joints, shafts, gear trains, pumps (e.g., air or liquid), pistons, drives, and/or other components that may create and/or undergo propulsion, rotation, and/or motion. An actuator may optionally have an associated driver that receives control commands for driving the actuator and converts those control commands into one or more signals for driving the actuator. In some implementations, each of the actuators 104*a-g* may be a servo motor that enables controllable rotation, about a respective axis, in a first direction and/or a second direction. It is understood that the actual "actuators" are "under" the exterior surfaces of balancing robot 100 indicated by references 104*a-g*.

Each of the actuators 104*a-g* provides a degree of freedom of movement for the balancing robot 100. The configuration of the actuators 104*a-g* dictates a robot arm pose of the robot arm 102 relative to a fixed reference point of the robot of the balancing robot 100. The robot arm pose of the robot arm 102 relative to a world frame is dictated by the configuration of the actuators 104*a-g* and by a balancing base pose of the balancing base 110 (i.e., since the pose of the connection point of the robot arm 102 to the torso 115 is dependent on the balancing base pose).

An end effector 105 is at a terminal end of the robot arm 102. In the figures herein, end effector 105 takes the form of a claw with two opposing "fingers" or "digits." The claw is one type of "gripper" known as an "impactive" gripper. In some implementations, end effector 105 may be removable, and various types of modular end effectors may be installed onto balancing robot 100, depending on the circumstances. The end effector pose of the end effector 105 relative to a fixed reference point of the robot of the balancing robot 100 is dictated by the robot arm pose of the robot arm 102. The end effector pose of the end effector 105 relative to a world frame is dictated by the robot arm pose and by the balancing base pose of the balancing base 110.

The actuators 104*a-g* enable the end effector 105 to be positioned at any one of a plurality of achievable end effector poses and enable the end effector 105 to be in any one of a plurality of achievable motion states. In some implementations, the robot arm 102 has kinematic redundancy, meaning that a given end effector pose of the end effector 105 relative to a fixed reference point of the balancing robot 100 may be achieved through any one of multiple distinct robot arm poses of the robot arm 102. In some implementations, the end effector pose of the end effector 105 may be defined by a three-dimensional position coordinate of a reference point of the end effector 105, such as reference point 106. In some implementations, the reference point of an end effector may be a center of mass of the end effector, and/or a point near where end effector attaches to other components of the robot, though this is not required.

Although a particular balancing robot 100 is illustrated in FIG. 4A and other figures herein, various techniques described herein may be utilized with other robots having one or more alternative or additional features. For example, more than one robot arm may be provided, robot arm(s) may be provided that that have more or fewer actuators than robot arm 102, and/or robot arms may be attached to structure that differs from torso 115. Also, for example, balancing base 110 may include more or fewer wheels (e.g., only a single wheel), wheels that differ from wheels 112*a*, 112*b* (e.g., mercanum wheels), or may include alternative locomotive structure in lieu of wheels (e.g., one or more controllable omnidirectional spherical rollers). As another example, additional or alternative vision sensors may be included (e.g., an alternative stereographic camera, a monographic camera, LIDAR sensor(s)), and/or vision sensors may be alternatively mounted (e.g., on a gimbal that automatically maintains the vision sensor aligned in a horizontal plane). As yet another example, different end effector(s) may be provided such as different types of gripper(s) (e.g., "ingressive", "astrictive", and/or "contigutive"), or other types of tools such as drills, brushes, cutting tools, deburring tools, welding torches, and so forth.

Figure 1:
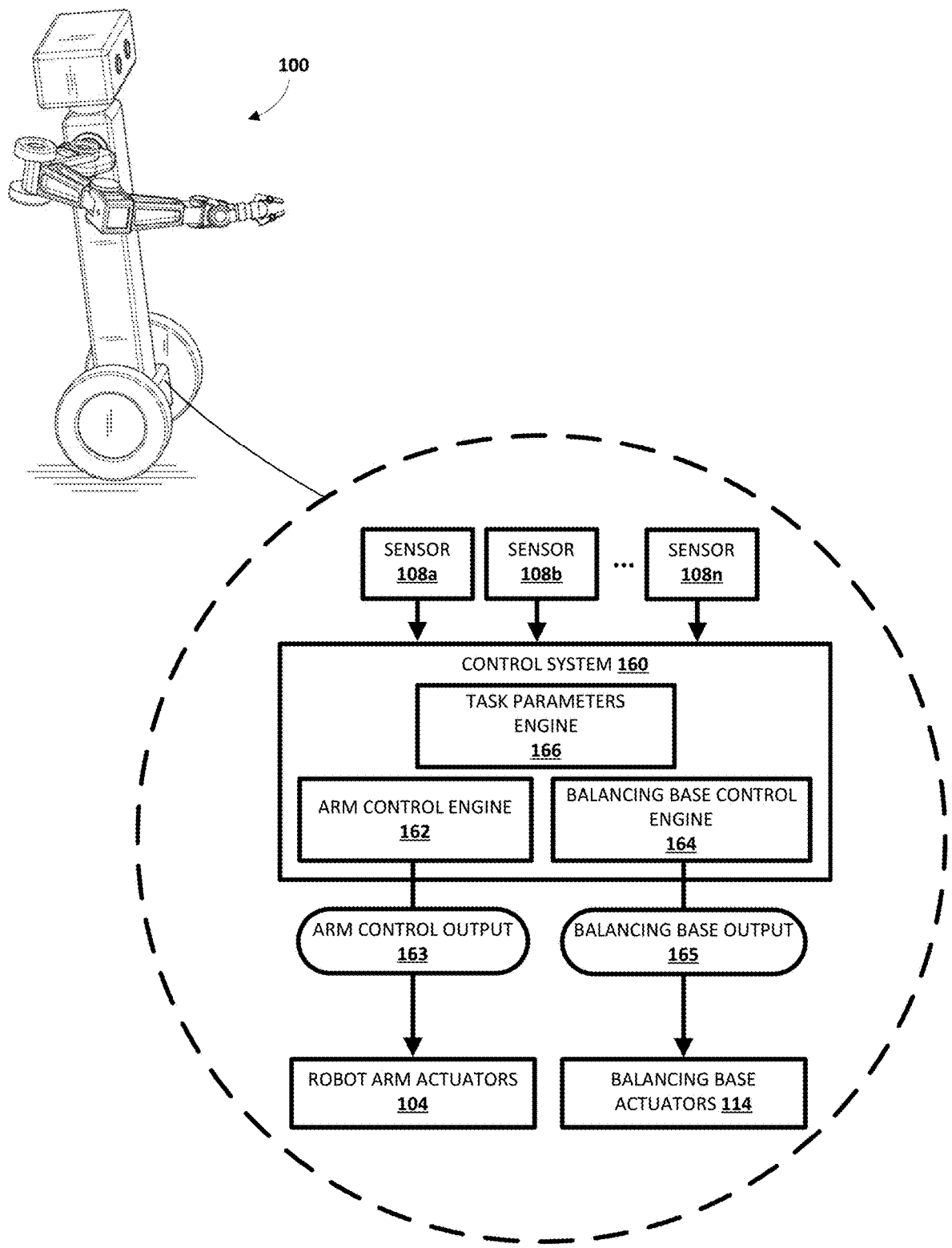
FIG. 1 illustrates an example balancing robot and example components of the robot via which implementations disclosed herein may be implemented.

Referring now to FIG. 1, the example balancing robot 100 and further example components of the balancing robot 100 are illustrated. The further components include a plurality of sensors 108*a-n*, a control system 160, robot arm actuators 104, and balancing base actuators 114. The robot arm actuators 104 collectively reference the actuators 104*a-g* that are referenced in FIG. 4A and that are described in more detail above and elsewhere herein. The balancing base actuators 114 drive and control the wheels 112*a*, 112*b*. For example, a first balancing base actuator may control the wheel 112*a* and a second balancing base actuator may control the wheel 112*b*.

The sensors 108*a-n* may include a variety of sensors. For example, the sensors 108*a-n* may include one or more of: sensors for each of the actuators 104 of the robot arm 102 (e.g., positional sensors); sensors coupled to the balancing base actuators 114 and/or the wheels 112*a*, 112*b* (e.g., encoders); an inertial measurement unit (IMU) (e.g., in the balancing base 110 and/or the torso 115); an inclinometer (e.g., in the balancing base 110 and/or the torso 115), and/or a force-torque sensor coupled to the end effector 105 (e.g., at or near actuator 104*a* to measure force applied to/by the end effector 105).

The control system 160 may be implemented in one or more processors, such as a CPU, GPU, and/or other controller(s) of the balancing robot 100. For example, one or more processors may execute instructions stored in associated memory to implement one or more aspects of the control system 160. In various implementations, the control system 160 may include an arm control engine 162, a balancing base control engine 164, and a task parameters engine 166. In some implementations, one or more of engines 162, 164, and/or 166 may be omitted, combined, and/or implemented in a component that is separate from control system 160. For example, engine 166, or any operative portion thereof, may be implemented in a component that is executed by a separate system, such as a separate system that is remote from balancing robot 100.

Arm control engine 162 generates arm control output 163 at each of a plurality of control cycles of control system 160, and provides the arm control output 163 to the robot arm actuators 104. The arm control output 163 (if any) at each of the control cycles may comprise a set of one or more control commands that dictate, inter alia, the parameters of motion (if any) for each of one or more of the robot arm actuators 104. As described herein, the arm control output 163 generated at a given control cycle may be based on various factors such as task parameters provided by task parameters engine 166 (e.g., a target end effector pose and/or force) and/or sensor data from one or more of the sensors 108*a-n*.

Balancing base control engine 164 generates balancing base output 165 at each of a plurality of control cycles of control system 160, and provides the balancing base output 165 to the balancing base actuators 114. The balancing base output 165 (if any) at each of the control cycles may comprise a set of one or more control commands that dictate, inter alia, the parameters of motion (if any) for each of one or more of the balancing base actuators 114. As described herein, the balancing base output 165 generated at a given control cycle may be based on various factors such as feedback input provided by balancing base control engine 164, task parameters provided by task parameters engine 166 (e.g., a target end effector pose and/or force), and/or sensor data from one or more of the sensors 108a-n.

Arm control output 163 and balancing base output 165 are illustrated in FIG. 1 as being provided separately to the robot arm actuators 104 and the balancing base actuators 114. However, in many implementations each iteration of the arm control output 163 and balancing base output 165 may be provided over a single bus and/or as part of a cohesive transmission.

Task parameters engine 166 may determine one or more task parameters that may influence the operation of the arm control engine 162 and/or the balancing base control engine 164. For example, the task parameters engine 166 may determine or receive (e.g., as input from a higher level motion planning system and/or human operator input) task input that sets forth one or more end effector poses to be traversed by the end effector 105. The task parameters engine 166 may determine task parameters that cause the engines 162 and 164 to generate, at each control cycle, corresponding outputs 163 and 165 that seek to maintain the end effector 105 in an end effector pose corresponding to that control cycle. As another example, the task parameters engine 166 may determine the balancing robot 100 is in a fallen state and determine parameters that cause the engines 162 and 164 to generate outputs 163 and 165 that cause the balancing robot 100 to return to a balanced state according to techniques described herein. As yet another example, the task parameters engine 166 may determine the balancing robot 100 is to apply force to an actuable environmental object and determine parameters that cause the engines 162 and 164 to generate outputs 163 and 165 that cause the balancing robot 100 to mitigate the risk of falling when interacting with actuable environmental objects and/or to lessen the disturbance to the balancing robot 100.

In many situations it may be desirable to maintain a given end effector pose of the end effector 105 for a plurality of control cycles, such as when performing a task that dictates the end effector 105 be in the given end effector pose for the plurality of control cycles. For example, the task parameters engine 166 may provide parameters to engine 162 and/or engine 164 that indicate the given end effector pose and indicate that it should be maintained for at least a plurality of control cycles. If the balancing base 110 of the balancing robot 100 is stable when the end effector 105 is in the given end effector pose, the given end effector pose may be maintained without further active intervention by the arm control engine 162 and the balancing base control engine 164 (e.g., without providing arm control output 163 and/or balancing base output 165 that cause adjustments to the actuators 104 and/or 114).

However, due to the inherent instability of the balancing base 110, a disturbance to the balancing base 110 may cause a large change in the end effector pose of the end effector 105 if the arm control engine 162 and the balancing base control engine 164 do not actively intervene. A disturbance to the balancing base 110 may be caused by various factors such as, for example, an external force applied to the balancing robot (e.g., a human contacting the balancing robot), a force applied by the balancing robot to an environmental object (e.g., the end effector 105 contacting the environmental object), purposeful movement of the robot arm 120 and/or the balancing base 110 (since those movements will introduce disturbance(s) to the balancing base 110), etc.

In some implementations, in response to receiving data that indicates a disturbance to the balancing base 110, the arm control engine 162 and/or the balancing base control engine 164 will actively intervene to iteratively generate outputs 163 and 165 that seek to balance the balancing robot while maintaining the given end effector pose. In some of those implementations, the data that indicates disturbance to the balancing base 110 may include sensor data from one or more of the sensors 108A-N. For example, data from encoders coupled to the wheels 112a, 112b of the balancing base 110 may indicate positional displacement and/or velocity that is indicative of a disturbance. As another example, an IMU may additionally or alternatively indicate a disturbance to the balancing base and parameters of the disturbance (e.g., positional displacement and/or velocity). As yet another example, a force-torque sensor coupled to the end effector 105 may indicate a disturbance to the balancing base 110 and parameters of the disturbance since a force at the end effector 105 will cause a corresponding disturbance to the balancing base 110. As yet a further example, a task driven balancing base output 165 applied to balancing base actuators 114 may indicate a disturbance and parameters of the disturbance since the application of the task driven balancing base output will cause a disturbance to the balancing base 110 (i.e., it will cause the balancing base actuators 114 to move, thereby moving the wheels 112a, 112b of the balancing base 110).

When the engines 162 and 164 have been provided with task parameter(s) that indicate it is desirable to maintain a given end effector pose and they receive data that indicates of a disturbance to the balancing base 110, the arm control engine 162 generates and provides arm control output 163 that adjusts the configuration of the robot arm 102 in view of the disturbance and in view of the given end effector pose to be maintained. In conjunction, the balancing base control engine 164 generates and provides balancing base output 165 that adjusts the balance angle of the balancing base 110 in view of adjusting the balancing robot 100 toward a balanced configuration and in view of the changes in the configuration of the robot arm 102 dictated by the engine 162.

As one example, velocity and/or displacement of the balancing base 110 as a result of a disturbance can be provided to the arm control engine 162 as a feedback input in determining an adjusted arm pose that will maintain the end effector 105 at the given end effector pose. The velocity and/or displacement of the balancing base 110 may be determined, for example, based on sensor data from one or more of the sensors 108a-n, such as encoders coupled to the wheels 112a, 112b (e.g., coupled to corresponding axles of the wheels). It is noted that the adjusted arm pose will cause the end effector 105 to be at a new pose relative to a fixed reference point of the balancing robot 100, but will maintain the given end effector pose in the world frame. For instance, displacement of the balancing base 110 can be fed in as feedback input to determine an adjusted arm pose that adjusts the end effector 105 to a new end effector pose, relative to the fixed reference point of the balancing robot 100, that is in a direction that is away from a direction of a tip force indicated by the disturbance. The arm control engine 162 may generate arm control output 163 to adjust one or more of the robot arm actuators 104 to the adjusted arm pose. In some implementations, the arm control output 163 may be generated to cause over-damped joint impedance in the robot arm actuators 104, which may make the arm actuator adjustments more "slow and sluggish" and minimize perturbations in balancing.

The adjusted arm pose determined by the arm control engine 162 may be provided as a feedforward input to the balancing base control engine 164. The balancing base control engine 164 may utilize the feedforward input in determining base compensation torque(s) to apply to balancing base actuators 114 to balance the balancing robot 100. Balancing base output 165 may be generated to adjust the balancing base actuators 114 and cause them to apply the base compensation torque(s).

The actions of the arm control engine 162 and the balancing base control engine 164 may be performed iteratively in a control loop to enable the given end effector pose to be maintained while actively adjusting the balancing base 110 toward a balanced configuration. A flowchart illustrating an implementation of iterative performance of an example control loop is provided in FIG. 2, described in detail below.

As used herein, maintaining a given end effector pose does not necessarily mean that the given end effector pose is strictly maintained without any displacement. Rather, maintaining a given end effector pose means that one or more processors are providing control commands or other output in an attempt to actively maintain the given end effector pose (the position and/or orientation). In some implementations, maintaining the given end effector pose means that any displacement from the given end effector pose is less than a threshold duration (e.g., less than 200 milliseconds, less than 5 control cycles) and/or is less than a threshold displacement distance in any dimension (e.g., less than 5 centimeters).

In some implementations, it may additionally or alternatively be desirable to maintain a given end effector force applied by the end effector 105. For example, the end effector 105 may be applying a given force to a table (e.g., cleaning the table) or other surface and it may be desirable to maintain the given force even when disturbances to the balancing base 110 occur. In some of those implementations, the arm control engine 162 may determine the adjusted arm pose and/or the balancing base control engine 164 may determine the base compensation torque(s) further in view of the given end effector force to be maintained.

As with maintaining a given end effector pose, maintaining a given end effector force does not necessarily mean that the given end effector force is strictly maintained without any variation. Rather, maintaining a given end effector force means that one or more processors are providing control commands or other output in an attempt to actively maintain the given end effector force. In some implementations, maintaining the given end effector pose means that any variation from the given end effector force is less than a threshold duration (e.g., less than 200 milliseconds, less than 5 control cycles) and/or is less than a threshold degree (e.g., less than 0.1 Newtons)

In some implementations, it may be determined that a target end effector force is not yet being applied by the end effector 105, and the adjusted arm pose and/or base compensation torque(s) may be determined in view of the target end effector force to be applied. As one example, a current end effector force may be determined based on a force-torque sensor (of the sensors 108a-n) that is coupled to the end effector 105, compared to the target end effector force, and the difference between the forces utilized by the arm control engine 162 in determining the adjusted arm pose and/or used by the balancing base control engine 164 in determining the base compensation torque(s). As yet another example, a current end effector force may be estimated based on the data that indicates the disturbance to the balancing base 110 (e.g., when the disturbance was caused by the end effector 105 contacting an environmental object), compared to the target end effector force, and the difference between the forces utilized by the arm control engine 162 in determining the adjusted arm pose and/or used by the balancing base control engine 164 in determining the base compensation torque(s). It is noted that in such an example a force-torque sensor coupled to the end effector 105 of the robot may be omitted, and the force applied to the end effector 105 estimated based on the data that indicates the disturbance to the balancing base 110. In some implementations, the target end effector force may be based on task parameter(s) provided by task parameters engine 166 (e.g., a task may call for end effector force of X Newtons to be applied).

Figure 2:
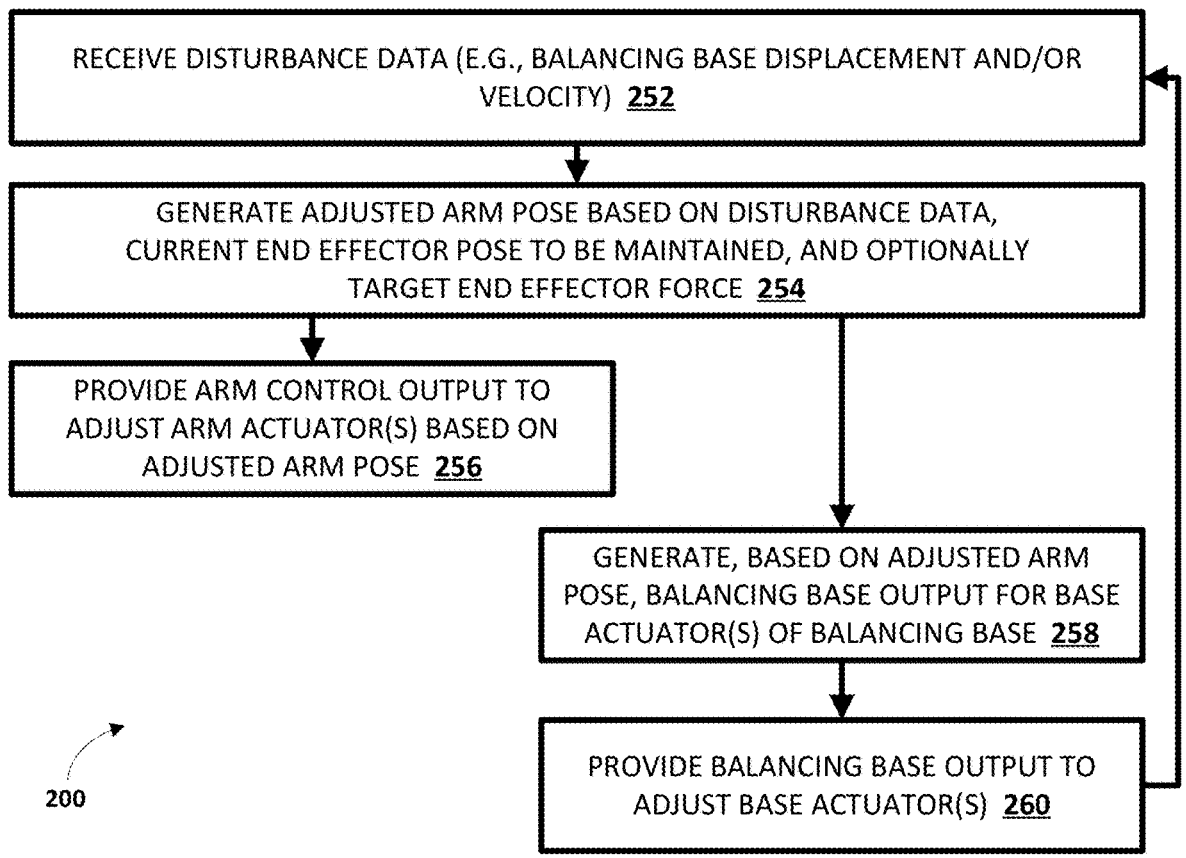
FIG. 2 is a flowchart illustrating an example method of maintaining an end effector pose of an end effector.

FIG. 2 is a flowchart illustrating an example method 200 of maintaining an end effector pose of an end effector. For convenience, the operations of the flow chart are described with reference to a system that performs the operations. This system may include, for example, one or more processors of a robot (e.g., balancing robot 100), such as one or more processors implementing all or aspects of control system 160. Moreover, while operations of method 200 are shown in a particular order, this is not meant to be limiting. One or more operations may be reordered, omitted or added.

At block 252, the system receives disturbance data that indicates a disturbance to a balancing base of a balancing robot. For example, the disturbance data may indicate a balancing base displacement that indicates an amount of displacement of the balancing base and/or may indicate a balancing base velocity that indicates a velocity of the displacement. In some implementations, the disturbance data is based on one or more sensors that are local to the balancing robot. In some implementations, the disturbance data is additionally or alternatively based on one or more purposeful control commands provided to adjust the balancing base and/or other components (e.g., a robot arm) of the balancing robot.

At block 254, the system generates an adjusted arm pose based on the disturbance data, a current end effector pose to be maintained, and optionally a target end effector force. For example, the system may use the disturbance data as feedback input to determine an adjusted arm pose that will maintain the end effector pose of the end effector. It is noted that the adjusted arm pose will cause the end effector to be at a new pose relative to a fixed reference point of the balancing robot, but will maintain the given end effector pose in the world frame. As another example, the system may additionally or alternatively use a target end effector force to determine an adjusted arm pose. The target end effector force may be an end effector force to be maintained or an end effector force that is desirable for a task being performed, but that has not yet been achieved.

As one particular example, assume the current end effector pose to be maintained is a three-dimensional pose relative to a reference point of the robot and defines a first position along a first axis, a second position along a second axis, and a third position along a third axis. Further assume the second axis is an axis that is parallel to an axis about which the balancing robot pivots (i.e., generally in/out in FIG. 4A—e.g., extending through the center of each of the wheels 112a, 112b), the third axis is a "vertical" axis (i.e., generally up/down in FIG. 4A) transverse to the second axis, and the first axis is transverse to the second and third axes (i.e., generally left/right in FIG. 4A). The current end effector pose may be provided by a higher level layer, such as a task parameters engine that provides the current end effector pose based on an a task being automatically performed or based on human operator input (e.g., with a joystick).

Continuing with the particular example, the system may determine the balancing base displacement based on the disturbance data. To determine the adjusted arm pose, the system may determine adjusted positions for the first position and the third position of the current end effector pose. For example, the system may determine an adjusted first position by multiplying the balancing base displacement by a first value (e.g., a first gain) (or otherwise modifying the balancing based displacement in view of the first value) and subtracting the resulting value from the first position. Also, for example, the system may determine an adjusted third position by multiplying the balancing base displacement by a second value (e.g., a second gain that is optionally distinct from the first gain) (or otherwise modifying the balancing based displacement in view of the second value) and subtracting the resulting value from the third position. This results in an adjusted end effector pose relative to the reference point of the robot that is defined by the first adjusted position, the second position, and the third adjusted position. It is noted the system may not adjust the second position since it is in a direction that will not be affected by the disturbance (i.e., when the balancing robot pivots in response to a disturbance, it pivots in only two dimensions). The system generates the adjusted arm pose to achieve the adjusted end effector pose.

As one variation of the particular example, the system may optionally determine the adjusted first position by subtracting the balancing base displacement from the first position without first modifying the balancing base displacement in view of the first value. Likewise, the system may additionally or alternatively determine the adjusted third position by subtracting the balancing base displacement from the third position without first modifying the balancing base displacement in view of the second value. In some implementations of this variation, the system may omit multiplications or other adjustments in view of the first and second values based on determining that the end effector is not in contact with any environmental object. In some of those implementations, when it is detected that the end effector is not in contact (after previously being in contact), the system may adjust the first and second values over multiple iterations of the method 500 to gradually lessen their impacts on the adjusted first and second positions, then omit the first and second values from the determinations of the adjusted first and second positions. The system may determine the end effector is not in contact with any environmental object utilizing various techniques. For example, the system may make such a determination directly based on sensor data that directly measures the contact (e.g., from a contact switch and/or force torque sensor of the end effector) and/or based on comparing the current state of the balancing robot with a model of the balancing robot as described herein.

As yet another variation of the particular example, the system may have detected an initial contact of the end effector with an environmental object in a prior iteration of the method 500. The system may have further detected an "initial balancing base displacement" at the time of the initial contact. The system may utilize the initial balancing base displacement at the time of the initial contact in determining the adjusted first position and the adjusted third position. For example, the system may determine an adjusted balancing base displacement by first subtracting the initial balancing base displacement from the balancing base displacement of the current iteration. The system may then utilize the adjusted balancing base displacement, in lieu of the balancing base displacement of the current iteration, in determining the adjusted first position and the adjusted third position.

At block 256, the system provides arm control output to adjust arm actuator(s) of the robot arm based on the adjusted arm pose.

At block 258, the system determines, based on the adjusted arm pose determined at block 254, balancing base output for base actuators of a balancing base of the robot. For example, the adjusted arm pose determined at block 254 may be provided as a feedforward input to the system and the system may utilize the feedforward input in determining base compensation torque(s) to apply to balancing base actuators to balance the base. The system mat determine the balancing base output so that it causes the balancing base actuators to apply the base compensation torque(s).

At block 260, the system provides balancing base output to adjust base actuators of the balancing base based on the balancing base output determined at block 258. In some implementations, blocks 256 and 260 may be performed in parallel (e.g., provided over a single bus in a single control command burst).

The system then returns to block 252 and performs another iteration of method 200. Multiple iterations of method 200 will typically be performed at a relatively high frequency (e.g., an iteration at each control cycle) before the balancing robot is stabilized. Moreover, method 200 may be part of an active process that is always running on the balancing robot to enable adaptation to various disturbances to the balancing robot that may occur due to purposeful movements of the balancing robot and/or due to interaction with environmental objects.

Figure 3:
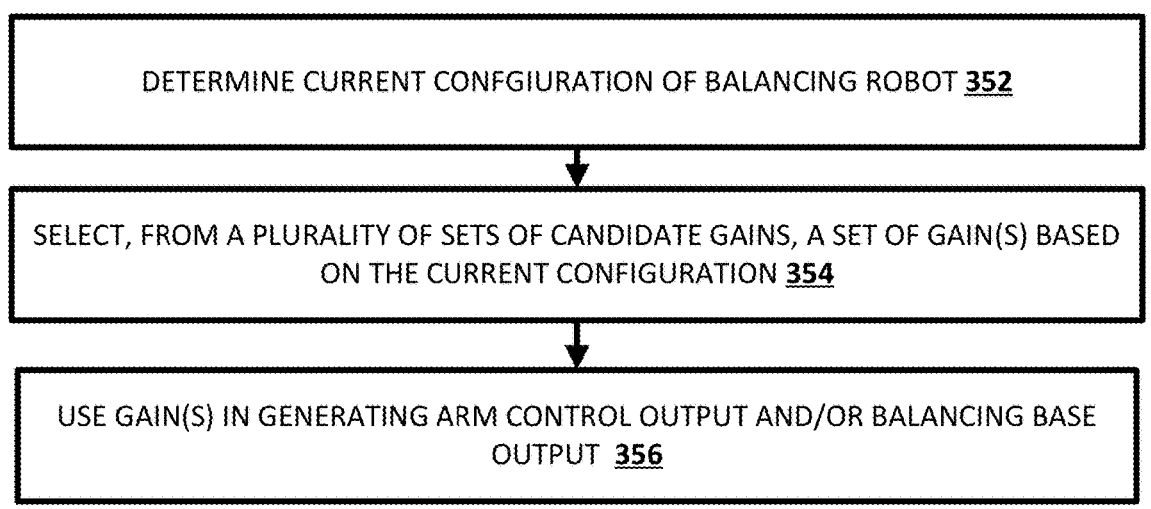
FIG. 3 is a flowchart illustrating an example method of selecting controller gain(s) based on a determined center of mass for a balancing robot.

FIG. 3 is a flowchart illustrating an example method 300 of selecting controller gain(s) based on a determined center of mass for a balancing robot. For convenience, the operations of the flow chart are described with reference to a system that performs the operations. This system may include, for example, one or more processors of a robot (e.g., balancing robot 100), such as one or more processors implementing all or aspects of control system 160. Moreover, while operations of method 300 are shown in a particular order, this is not meant to be limiting. One or more operations may be reordered, omitted or added.

At block 352, the system determines a current configuration of the balancing robot. For example, the system may determine the current configuration based on the current configuration of each of a plurality of adjustable components of the robot, such as a robot arm and a balancing base of the robot. The system may determine the current configuration based on various sensors, such as sensors associated with actuators of the adjustable components of the robot, an IMU sensor, and inclinometer, and/or other sensors.

At block 354, the system selects, from a plurality of sets of candidate gains, a set of one or more gains based on the current configuration determined at block 352. For example, the system may determine a center of mass of the robot based on the current configuration determined at block 352 (e.g., by applying the current configuration to a forward dynamic model of the balancing robot), and use the center of mass to select a set of one or more gains that are associated with that center of mass in one or more computer readable media. For example, the controller gain(s) may be selected from a plurality of candidate controller gains that are each associated with one or more corresponding centers of mass. For instance, a first controller gain may be associated with a first set of centers of mass, a second controller gain may be associated with a non-overlapping second set of centers of mass, etc.

At block 356, the system uses the one or more gains selected at block 354 in generating arm control output and/or balancing base output. For example, the system may set one or more controller gains used by the by the system in method 200 (FIG. 2) and/or other methods described herein. For instance, the controller gains may be used by the system to influence the adjusted arm pose and/or base compensation torque(s) determined in implementations of the method 200 of FIG. 2.

In some implementations, the method 300 of FIG. 3 is performed iteratively (e.g., at each control cycle, in response to a disturbance, at other interval), and may update gains at each iteration if those gains are different from currently utilized gains. For example, the method 300 of FIG. 3 may be performed iteratively while the method 200 is being performed (at the same frequency or at a different frequency). Accordingly, the method 200 of FIG. 2 may be performed with first gain(s) in some iterations and performed with different gain(s) in other iterations.

Referring now to FIGS. 4A, 4B, 5A, and 5B, some examples are provided of maintaining an end effector pose and/or end effector force while actively balancing in response to a disturbance.

FIG. 4A illustrates the balancing robot 100, with the end effector 105 of the robot in a particular end effector pose relative to a world frame. An environmental point 101 is illustrated in FIG. 4A to show the pose of the end effector 105 relative to the environmental point 101.

Figure 4B:
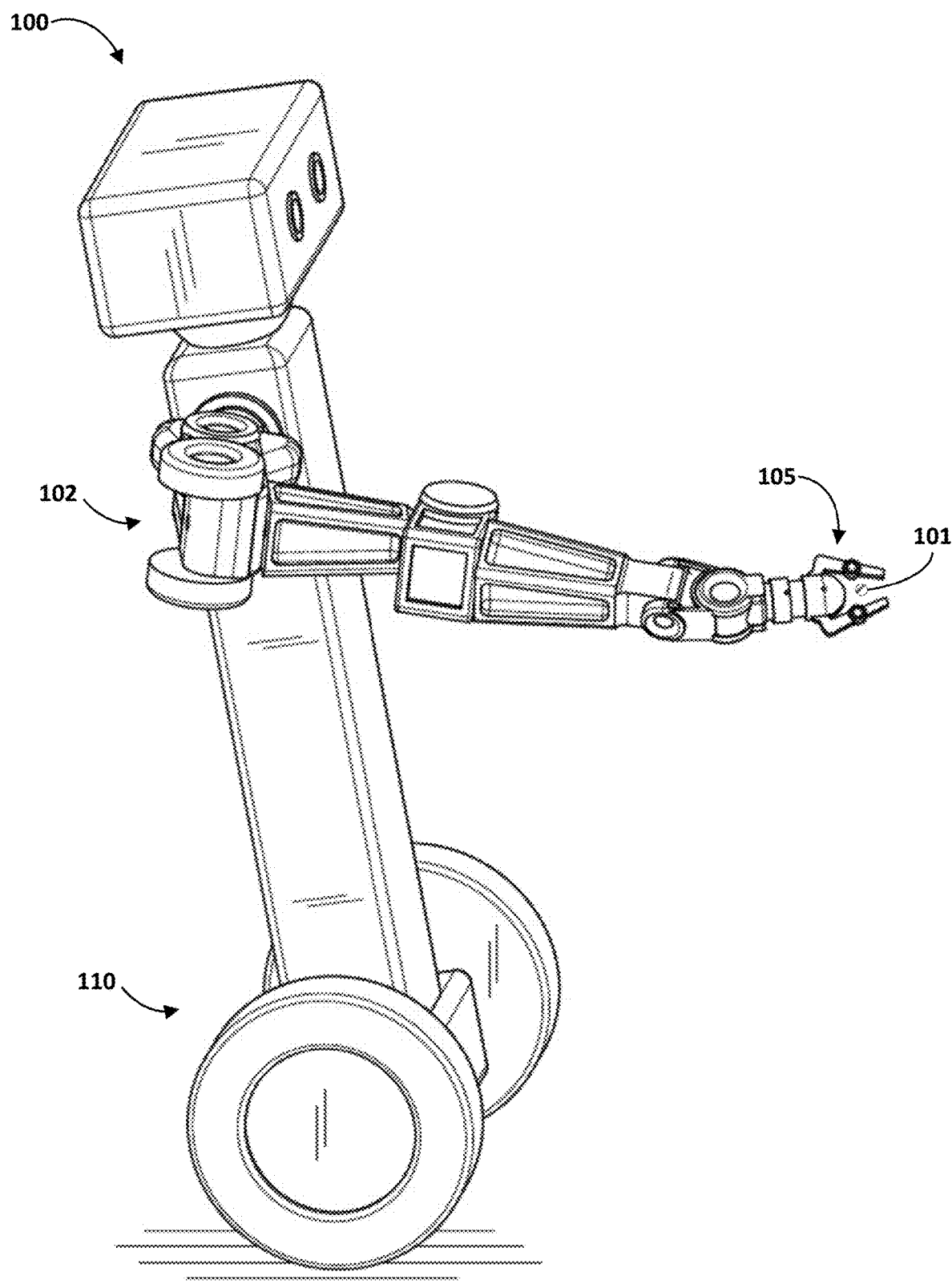
FIG. 4B illustrates the balancing robot of FIG. 1 after a disturbance to a balancing base of the balancing robot when it was in the configuration of FIG. 4A; the particular pose of the end effector has been maintained through adjustment of the robot arm and the balancing base.

FIG. 4B illustrates the balancing robot 100 after a disturbance to the balancing base 110 that occurs when the balancing robot 100 was in the configuration of FIG. 4A. The particular pose of the end effector 105 has been maintained as illustrated by the pose of the end effector 105 relative to the environmental point 101 (the environmental point 101 is the same as that illustrated in FIG. 4A). As can be appreciated by viewing FIGS. 4A and 4B, the robot arm pose of the robot arm 102 and the balancing base pose of the balancing base 110 in FIG. 4B, relative to a reference point of the balancing robot 100, are both adjusted relative to their poses in FIG. 4A. The poses have been adjusted through multiple iterations of actively balancing the balancing robot 100 in response to the disturbance, while also actively seeking to maintain the particular end effector pose of the end effector 105. For example, the poses may be adjusted through multiple iterations of the method 200 of FIG. 2. It is understood that during the multiple iterations multiple intermediate additional poses of the balancing base 110 and the robot arm 102 will occur, where each of those intermediate additional poses maintain the particular end effector pose.

Figure 5A:
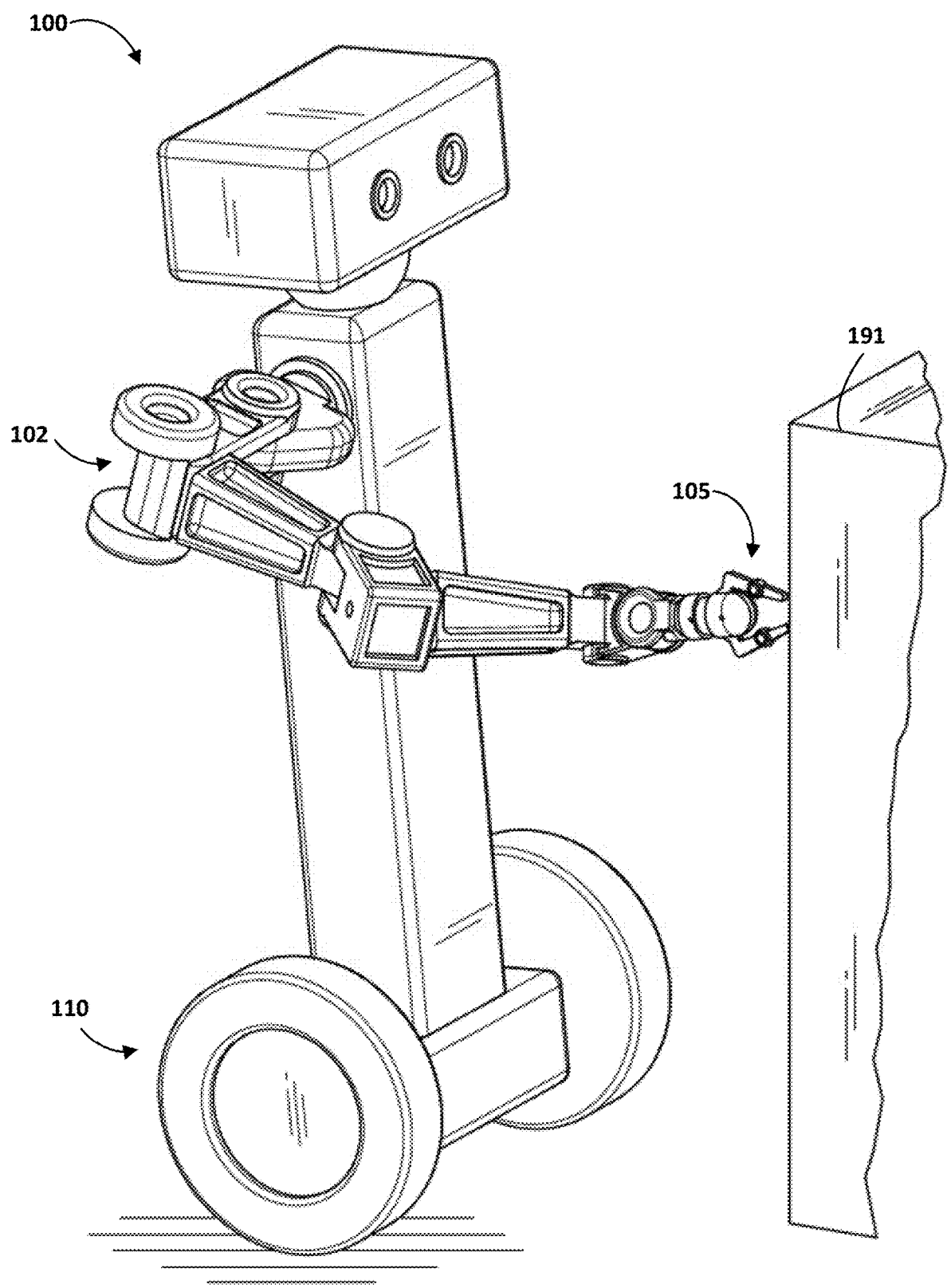
FIG. 5A illustrates the balancing robot of FIG. 1 with an end effector of the robot initially contacting an object at a particular location and with a particular force.

FIG. 5A illustrates the balancing robot 100 with the end effector 105 initially contacting an environmental object 191 at a particular location and with a particular force.

Figure 5B:
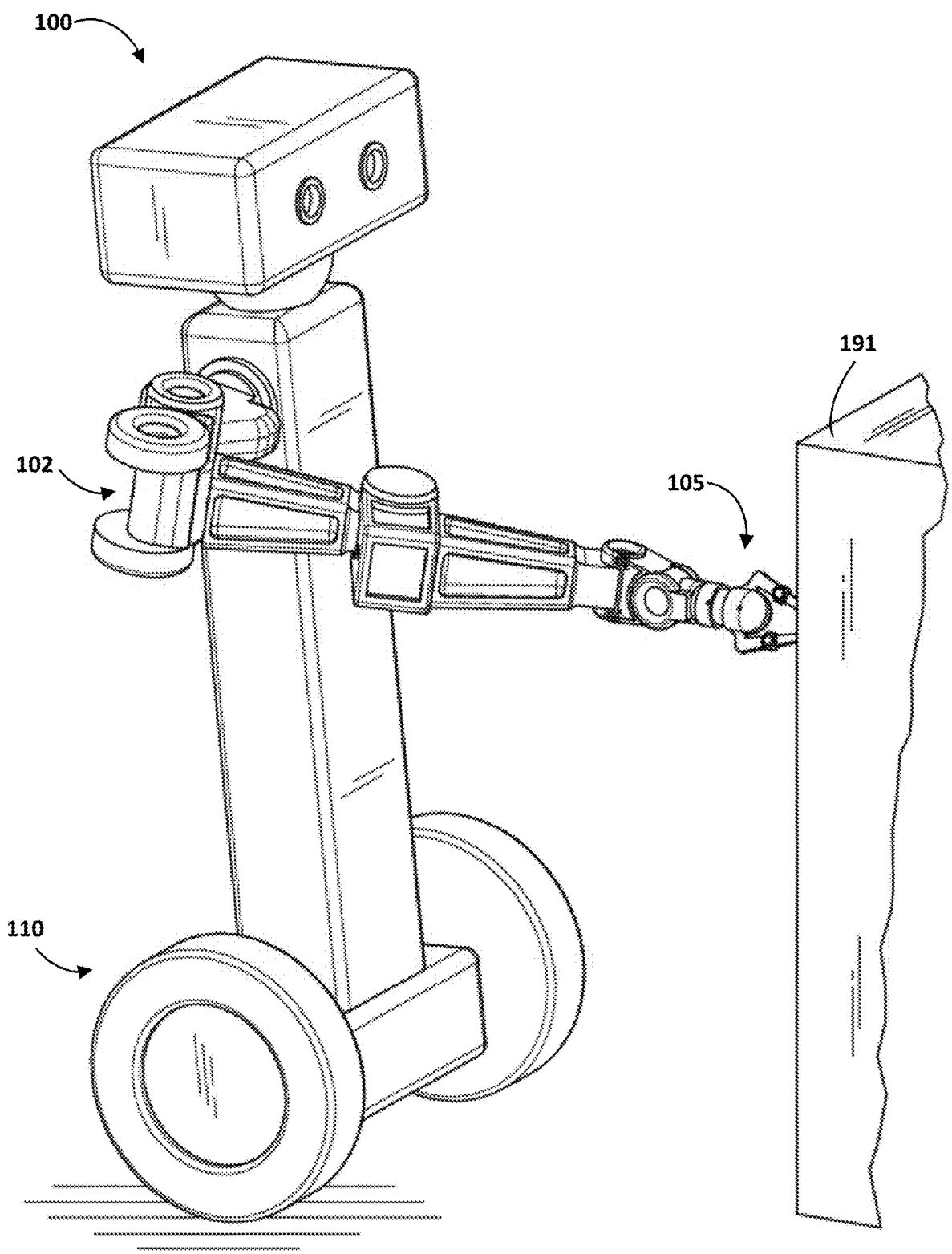
FIG. 5B illustrates the balancing robot of FIG. 1 after a disturbance to a balancing base of the balancing robot when it was in the configuration of FIG. 5A (the disturbance is a result of the contact of FIG. 5A); the end effector continues to contact the object at the particular location and with the particular force through adjustment of the robot arm and the balancing base.

FIG. 5B illustrates the balancing robot of FIG. 1 after a disturbance to the balancing base 110. The disturbance occurs when the balancing robot 100 was in the configuration of FIG. 5A and is a result of the initial contact with the object 191 that is illustrated in FIG. 5A. The end effector 105 continues to contact the object 191 at the particular location in FIG. 5A (i.e., the pose of the end effector 105 is maintained), and continues to contact the object 191 with the particular force. As can be appreciated by viewing FIGS. 5A and 5B, the robot arm pose of the robot arm 102 and the balancing base pose of the balancing base 110 in FIG. 5B, relative to a reference point of the balancing robot 100, are both adjusted relative to their poses in FIG. 5A. The poses have been adjusted through multiple iterations of actively balancing the balancing robot 100 in response to the disturbance, while also actively seeking to maintain the particular end effector pose of the end effector 105 and actively seeking to maintain the particular end effector force applied by the end effector 105 to the object 191. It is understood that during the multiple iterations multiple intermediate additional poses of the balancing base 110 and the robot arm 102 will occur, where each of those intermediate additional poses maintain the particular end effector pose and maintain the particular end effector force.

In some implementations, the balancing base control engine 164 may provide balancing base output 165 that causes the balancing base 110 to achieve near holonomic motion. In some of those implementations, the balancing base output 165 is provided to cause the balancing base actuators 114 to drive the wheels 112a, 112b so that a sidewinding behavior of the balancing base 110 is achieved. For example, to achieve the sidewinding behavior the balancing base output may cause a first sinusoidal torque to be applied by the balancing base actuator 114 that drives the wheel 112a and may cause a second sinusoidal torque to be applied by the balancing actuator 114 that drives the wheel 112b. The first sinusoidal torque has a first phase and the second sinusoidal torque has a second phase, that is offset from the first phase. For instance, the first and second sinusoidal torques may be the same frequency, but be out of phase by a small degree (e.g., out of phase by 20 degrees or less). This difference in phases between the separate sinusoidal torques may cause the sidewinding behavior to be achieved.

In some implementations, the balancing base control engine 164 may provide such output in response to task parameters provided by task parameters engine 166 that dictate sidewinding behavior should occur to achieve a task. In some of those implementations, the task parameters engine 166 may also provide task parameters that indicate a given end effector pose should be maintained during some or all of the sidewinding behavior. For example, the arm control engine 162 may generate arm control output 163 that seeks to maintain the given end effector pose and the balancing base control engine 164 may generate balancing base output 165 based on corresponding arm control pose feedforward input provided by the arm control engine 162, in an effort to achieve a balanced configuration while also maintaining a given end effector pose of the end effector 105. In some other implementations, the sidewinding behavior may be performed without actively seeking to maintain the given end effector pose. For example, the arm control engine 162 and/or the balancing base control engine 164 may generate corresponding outputs 163 and 165 in an effort to achieve a balanced configuration, but they may do so without also seeking to maintain the given end effector pose of the end effector 105.

In some implementations, the control system 160 may detect that the balancing robot 100 is in a fallen configuration and transition the balancing robot 100 from the fallen configuration to a balanced configuration. The balancing robot 100 may be in the fallen configuration due to a variety of factors, such as application of a significant disturbance to the balancing robot 100, a failure by the control system 160 in actively balancing the balancing robot 100, etc.

In some implementations, the task parameters engine 166 may detect that the balancing robot 100 is in a fallen configuration. For example, the engine 166 may detect a fallen configuration based on sensor data from an IMU of the sensors 108a-n that indicates the balancing robot 100 has fallen and/or sensor data from encoders (coupled to wheels 112a, 112b) of the sensors 108a-n that indicates that the balancing robot has fallen (e.g., encoder sensor data that indicates an unintended significant positional displacement).

In some of those implementations, in response to detecting the balancing robot is in a fallen configuration, the task parameters engine 166 may provide task parameters that cause the arm control engine 162 to generate multiple iterations of arm control output 163 that cause the robot arm 102 to apply force to a surface (e.g., the ground) to force the balancing robot 100 out of the fallen configuration and through a plurality of configurations toward (and optionally through) a balanced configuration. In some versions of those implementations, during the transitioning through the configurations, the task parameters engine 166 may monitor one or more balance criteria. In response to determining satisfaction of the balance criteria during the monitoring, the task parameters engine 166 may provide task parameters to balancing base control engine 164 to cause the balancing base control engine 164 to provide multiple iterations of balancing base output 164 that causes active adjustment of one or more of the balancing base actuators 114 toward a balanced configuration. Awaiting satisfaction of the balance criteria before providing such balancing base output may make the transition to active adjustment toward a balanced configuration less jarring (to robotic components and/or human observer(s)) than if the balancing base output were provided prior to the satisfaction of the balance criteria.

In some implementations, the balancing base control engine 164 may also optionally provide balancing base output 165 during the transitioning of the balancing robot 100 to cause torque to be applied by the balancing base actuators 114 that causes the wheels 112a, 112b to assist in the transitioning through one or more of the configurations. Such generated balancing base output 165 may be provided to assist in the transitioning, but balancing base output 165 that actively adjusts the balancing base 110 toward a balanced configuration (e.g., through pendulum like oscillations of the torso 115) may not be provided until satisfaction of the balance criteria.

In some implementations, the task parameters engine 164 generates balancing commands (e.g., torques to be applied to the balancing base actuators) at each of the plurality of configurations, but does not provide balancing base output 165 based on those balancing commands until satisfaction of the balance criteria is determined. In some of those implementations, the engine 164 or the task parameters engine 166 monitors for the satisfaction of the balance criteria based on determining whether each of the balancing commands satisfies one or more of the balance criteria. For instance, the balance criteria may be that the balancing commands indicate that zero, or close to zero, torque is to be applied to the balancing base actuators 114 (which may indicate that the balancing robot is in a balanced or near balanced configuration). In some implementations, the task parameters engine 166 additionally or alternatively monitors for the satisfaction of the balance criteria based on determining whether sensor data satisfies one or more of the balance criteria. For instance, one or more of the balance criteria may be satisfied if sensor data from an inclinometer indicates a balance angle at or near 90 degrees, sensor data from an IMU indicates a center of mass satisfying certain balance criteria, etc.

In some implementations, some torque may be applied by the balancing base actuators 114 in the fallen configuration. For example, if the balancing robot 100 is on an incline/decline the balancing base control engine 164 may cause some torque to be applied to prevent further movement of the balancing robot 100 when it is in the fallen configuration. In some of those implementations, the balance criteria may be based on the applied torque in the fallen configuration. For example, instead of the balance criteria being that the balancing commands indicate that zero, or close to zero, torque is to be applied—the balance criteria may be that the balancing commands indicate that torque is to be applied that is the same as or near the torque that is being applied in the fallen configuration.

Figure 6:
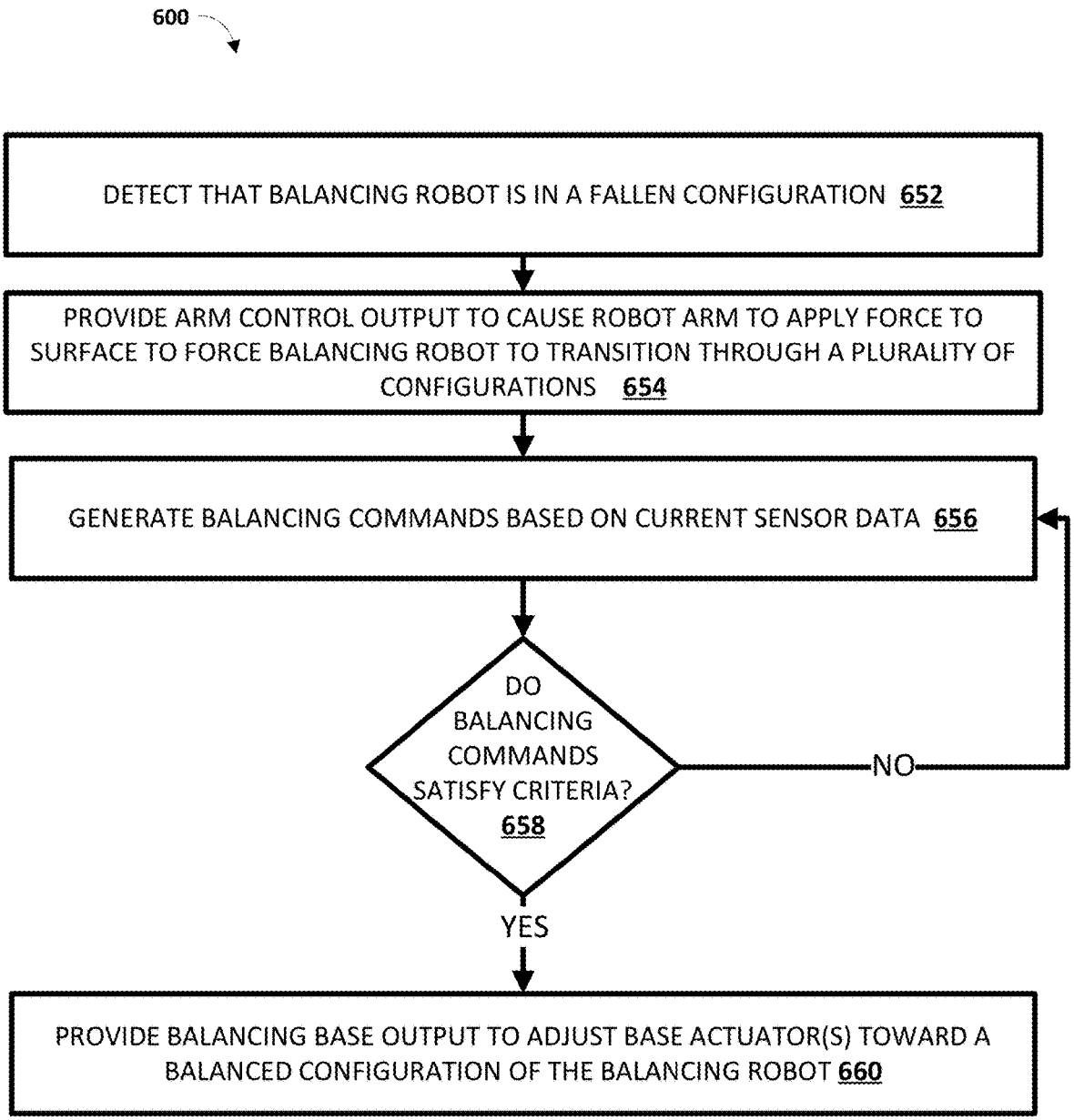
FIG. 6 is a flowchart illustrating an example method of transitioning a balancing robot from a fallen configuration to a balanced configuration.

FIG. 6 is a flowchart illustrating an example method 600 of transitioning a balancing robot from a fallen configuration to a balanced configuration. For convenience, the operations of the flow chart are described with reference to a system that performs the operations. This system may include, for example, one or more processors of a robot (e.g., balancing robot 100), such as one or more processors implementing all or aspects of control system 160. Moreover, while operations of method 600 are shown in a particular order, this is not meant to be limiting. One or more operations may be reordered, omitted or added.

At block 652, the system determines that a balancing robot is in a fallen configuration. For example, the system may determine the balancing robot is in a fallen configuration based on sensor data from one or more sensors of the balancing robot.

At block 654, the system provides arm control output to cause a robot arm of the balancing robot to apply force to a surface to force the balancing robot to transition through a plurality of configurations. In some implementations, the system provides the arm control output without causing any additional torque (that is in addition to any already being applied in the fallen configuration) to be applied to wheels or other movers of a balancing base of the balancing robot.

At block 656, the system generates balancing commands based on current sensor data. In some implementations, the balancing commands may indicate torque (if any) that should be applied to actuators of the balancing base to move the balancing base toward a balanced configuration. The current sensor data based on which the balancing commands are generated may be from one or more sensors such as an IMU.

At block 658, the system determines whether the balancing commands satisfy one or more criteria. For example, the system may determine the balancing commands satisfy the one or more criteria if they indicate a given torque, are within a threshold of the given torque, or if they indicate that the given torque has been surpassed. In some implementations, at block 658 the system additionally or alternatively monitors for the satisfaction of the balance criteria based on determining whether current sensor data satisfies one or more of the balance criteria—without necessarily generating balancing commands based on the current sensor data. In some of those implementations block 656 may be omitted.

If the system determines at block 658 that the balancing commands do not satisfy the criteria, the system returns to block 656. In many implementations, multiple iterations of block 656 and 658 will occur as the balancing robot is transitioning through the configurations.

If the system determines at block 658 that the balancing commands do satisfy the criteria, the system proceeds to block 660.

At block 660, the system provides balancing base output to adjust one or more base actuators of the balancing robot toward a balanced configuration of the balancing robot. For example, the system may transition into an active balancing state and generate and provide multiple iterations of balancing base output to balance the balancing base.

Figure 7A:
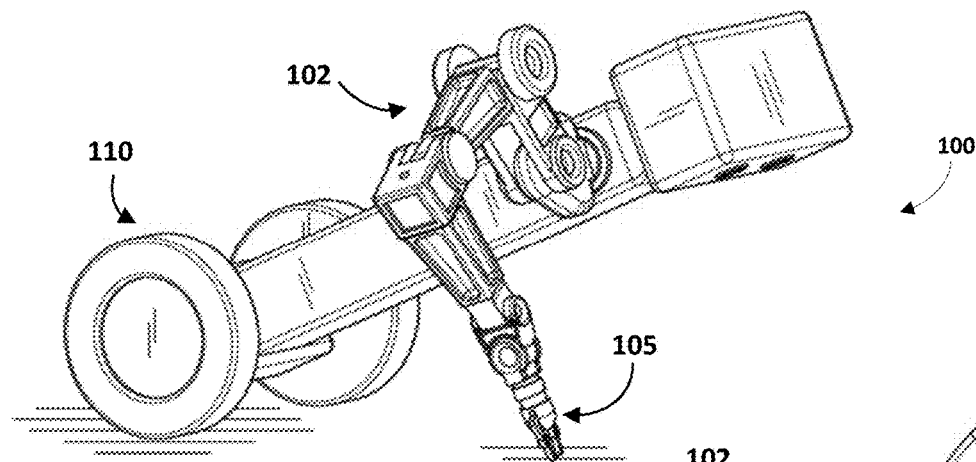
FIGS. 7A, 7B, and 7C illustrate the balancing robot of FIG. 1 transitioning from a fallen configuration to a balanced configuration.
Figure 7B:
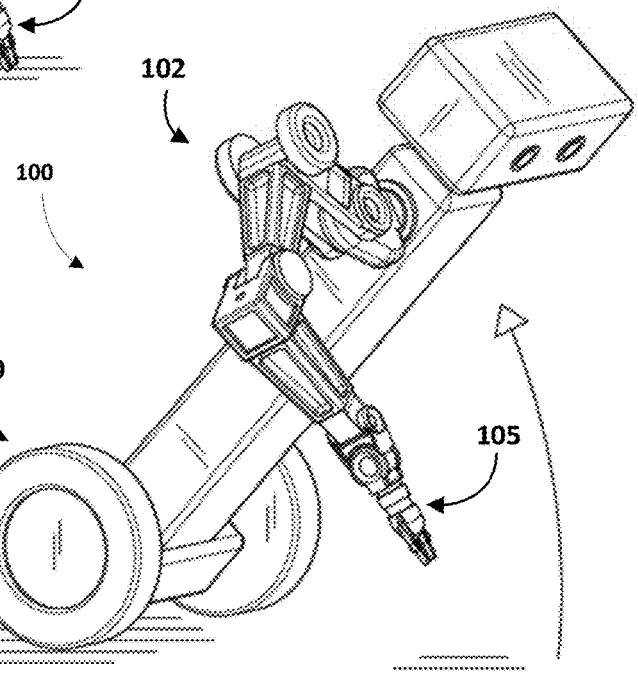
Figure 7C:
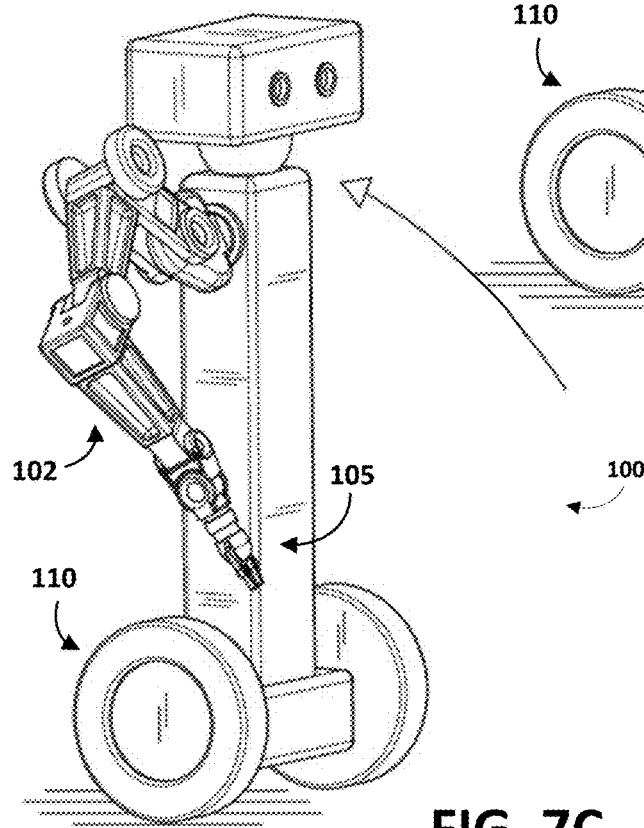

FIGS. 7A, 7B, and 7C illustrate the balancing robot 100 transitioning from a fallen configuration to a balanced configuration. In particular, FIG. 7A shows the balancing robot 100 in a fallen configuration, FIG. 7B shows the balancing robot 100 in an intermediary configuration, and FIG. 7C shows the balancing robot 100 in a balanced configuration.

In FIG. 7A, the robot arm 102 is in a robot arm pose such that the end effector 105 is contacting the ground. In other implementations, components of the robot arm 102 itself may contact the ground in addition to or instead of the end effector 105. In some implementations, the robot arm 102 may be adjusted to the robot arm pose of FIG. 7A in response to determining the balancing robot 100 is in the fallen configuration. For example, it may be adjusted to that pose and used to move the balancing robot 100 slightly from an initial fallen configuration to the fallen configuration illustrated in FIG. 7A. In some implementations, the robot arm may be adjusted to the robot arm pose of FIG. 7A while the robot is actively falling (e.g., to "catch" the balancing robot 100 based on determining the balancing robot 100 is falling).

In the fallen state of FIG. 7A, force is applied to the ground, via the end effector 105 and through movement of actuators of the robot arm 102 (in response to corresponding arm control output). The applied force forces the balancing robot 100 out of the fallen configuration and through a plurality of configurations toward a balanced configuration. For example, as a result of the applied force, the balancing robot 100 transitions through the configuration illustrated in FIG. 7B, and to (and optionally through) the balanced configuration of FIG. 7C. It is understood that the balancing robot 100 will also transition through a plurality of configurations between those of FIG. 7A and FIG. 7B and through a plurality of configurations between those of FIG. 7B and FIG. 7C.

FIG. 7C illustrates a balanced configuration of the balancing robot 100. At or near the balanced configuration of FIG. 7C, the control system 160 may determine that the one or more balance criteria are satisfied, and, in response, transition into an active balancing state and generate and provide multiple iterations of balancing base output to balance the balancing robot 100. In many implementations, in balancing the balancing robot 100, the balancing robot 100 will transition in a pendulum-like manner from the balanced configuration of FIG. 7C as it stabilizes to a balanced configuration (that may be the same balanced configuration of FIG. 7C, or an alternative configuration, e.g., with the robot arm 102 in a different robot arm pose). For example, the active balancing may start when the balancing robot 100 is in or near (e.g., right after passing through) the configuration of FIG. 7C, and will cause perturbations to multiple unbalanced configurations while stabilizing to a balanced configuration.

In some implementations, for a task of the balancing robot 100 that involves interaction with an actuable environmental object, the control system 160 may cause arm control output and/or balancing base output to be generated that mitigates the risk that the balancing robot 100 will fall when interacting with the object and/or to lessen the disturbance to the balancing base 110 when interacting with the object. For example, in response to determining a task includes interaction with an actuable object, the task parameters engine 166 may provide one or more task parameters to arm control engine 162 and/or balancing base control engine 164 to cause them to generate certain output during, and/or in advance of, interaction between the balancing robot 100 and the actuable object.

In some of those implementations, the arm control engine 162 may provide one or more iterations of arm control output 163 that causes the end effector 105 to contact an actuable object and: apply a movement force to move (or otherwise actuate) the object; and simultaneously apply a counteracting force through the contact with the object. The counteracting force counteracts one or more disturbances to the balancing base 110 that will occur as a result of application of the movement force by the robot.

Figure 9B:
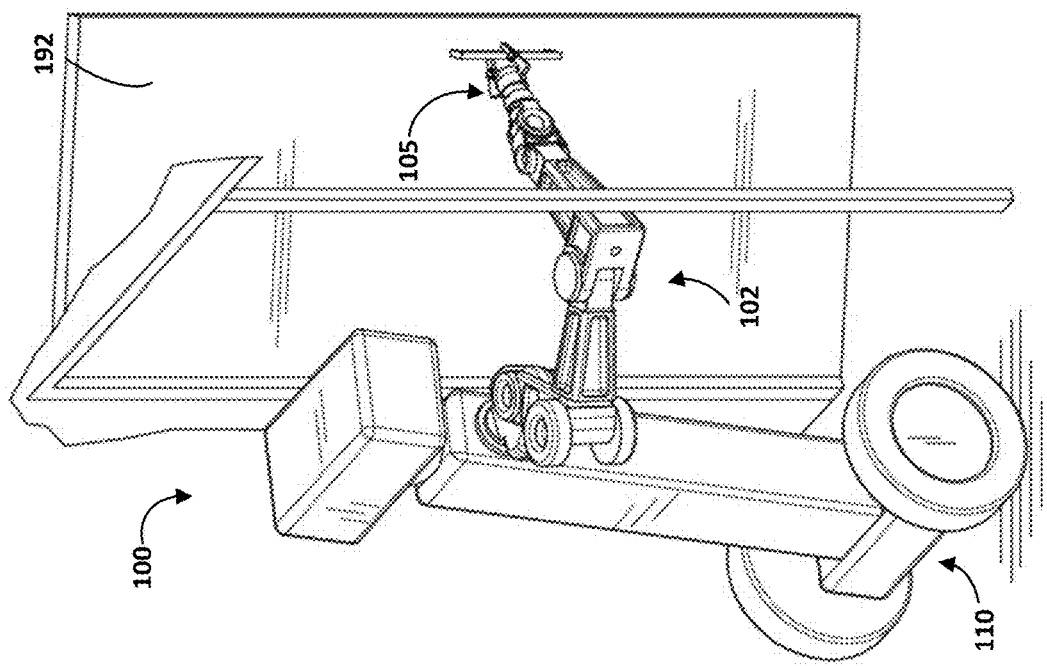
FIG. 9B illustrates the balancing robot of FIG. 1 at a point in time after that of FIG. 9A; the balancing robot is opening the door while applying both the movement force and the counteracting force.
Figure 9A:
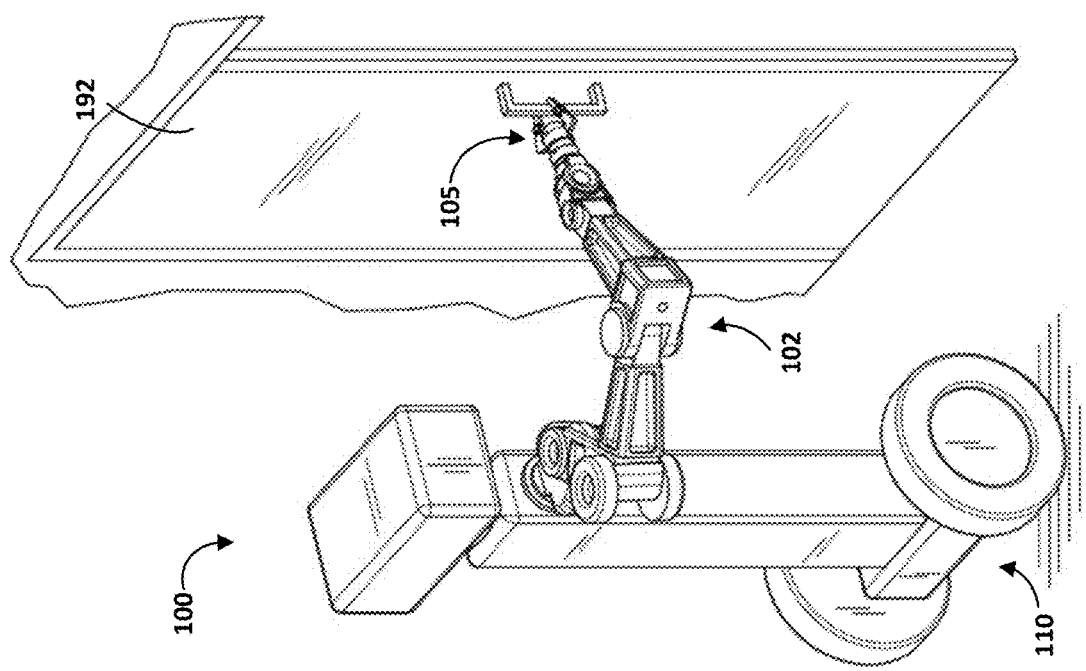
FIG. 9A illustrates the balancing robot of FIG. 1 applying counteracting force to a door.

One example is provided with reference to FIGS. 9A and 9B. FIGS. 9A and 9B illustrate one example of one or more counteracting forces that may be applied to a door 192 while simultaneously applying one or more movement forces to the door 192 to open the door.

FIG. 9A illustrates the balancing robot 100 applying a counteracting force to the door 192. The counteracting force may be applied to the door 192 via the end effector 105 (as a result of the end effector 105 grasping the handle of the door 192), and may be applied by providing output to the actuators of the robot arm 102 that cause the counteracting force to be applied at the end effector 105. As one example, the counteracting force applied initially in FIG. 9A may be in a "downward" direction toward the floor (i.e., the end effector 105 pushes "down" on the handle) to create a resulting force about the pivot of the balancing robot 100 that is in a direction away from the door 192. As described below, this may counteract the force toward the door 192 that is created when the moment of inertia of the door 192 is exceeded as a result of the movement force and the door begins to open. As another example, the counteracting force applied initially in FIG. 9A may be in an "upward" direction away from the floor (i.e., the end effector 105 pulls "up" on the handle) to create a resulting force about the pivot of the balancing robot 100 that is in a direction toward the door. As described below, this may counteract the force away from the door 192 that is created when movement force is initially applied to the door 192 (and before its moment of the inertia is exceeded). As also described below, in some implementations, during opening of the door 192 the "upward" counteracting force may be initially applied and the "downward" counteracting force then applied (e.g., at or near the time when the moment of inertia of the door 192 is exceeded).

The balancing robot 100 also applies a movement force to the door 192, in a forward direction toward the door, and applies the movement force to push open the door. The movement force may be applied to the door 192 via the end effector 105, and may be applied by providing output to the actuators of the robot arm 102 that cause force to be applied at the end effector 105 in the forward direction and/or by applying output to the balancing base actuators that drive the wheels 112a, 112b to cause the balancing base 110 to move in the forward direction and resultantly cause force to be applied at the end effector 105 in the forward direction.

During at least part of the time the door 192 is transitioning from the closed state of FIG. 9A to the open state of FIG. 9B, one or more movement forces will be applied to the door 192 by the end effector 105 simultaneously with one or more counteracting forces. Such simultaneous application of a movement force and a counteracting force at a given time will result in effectively applied force that is a blend of both the movement force and the counteracting force (i.e., with a direction and magnitude that is based on both of the forces).

The counteracting force applied at any given time during opening the door 192 is applied to mitigate disturbances to the balancing base 110 that occur as a result of application of the movement force at or near the given time. For example, when movement force is applied to push open the door 192 when it is in the closed state of FIG. 9A, it will result in a force that is in a direction that would cause the torso 115 of the balancing robot 100 to tip backward away from the door 192. Applying counteracting force at the end effector 105 that pulls upward on the handle will result in a force that would cause the torso 115 of the balancing robot 100 to tip forward toward the door. Accordingly, applying such a counteracting force may mitigate the force applied as a result of the movement force and optionally lessen a degree of active balancing of the balancing robot 100 that may be needed.

As another example, before, at, or near the time the moment of inertia of the door 192 is exceeded, a counteracting force may be applied that is in a "downward" direction toward the floor (i.e., the end effector 105 pushes "down" on the handle) to create a resulting force about the pivot of the balancing robot 100 that is in a direction away from the door. Such a counteracting force may counteract tipping of the balancing robot 100 in a forward direction toward the door 192 that may occur once the moment of inertia of the door 192 is exceeded. By applying such a counteracting force before, at, or near the time the moment of inertia is exceeded, the forward tipping may be counteracted and may lead to a lesser degree of tipping than if the counteracting force was not applied.

In some implementations, a counteracting force is initially applied to the door 192 without simultaneous application of the movement force, and the movement force is then applied simultaneously with the counteracting force (i.e., to create a blended applied force). In some other implementations, a counteracting force and a movement force may both be initially applied to the door 192 simultaneously. In yet other implementations, the movement force may be initially applied without simultaneous application of the counteracting force, and the counteracting force then applied simultaneously with the movement force. In some implementations, the movement force and/or counteracting force applied by the balancing robot 100 may vary during pushing open the door 192. For example, counteracting and movement forces of corresponding first magnitudes may be applied at a first time period, and one or both of the first magnitudes (but not necessarily directions) may be iteratively increased until the door 192 begins to open (at which point the magnitudes may be maintained or increased). As another example, in some implementations a first counteracting force may be applied until near the time the moment of inertia of the door 192 is exceeded by the movement force, at which point an opposed second counteracting force may be applied. In some of those implementations, the control system 160 may determine the moment of inertia of the door 192 is exceeded based on sensor data from one or more sensors 180*a*-*n* (e.g., an IMU).

Although FIGS. 9A and 9B illustrate pushing open the door 192, similar techniques may also be used in pulling open the door 192 (although the forces involved will be different). Also, although FIGS. 9A and 9B illustrate the end effector 105 grasping the handle of the door 192 to apply counteracting force, variations are possible. For example, the end effector 105 may apply force to the handle without grasping it or the grasping end effector 193 may apply force to a knob or other structure of another door. As another example, a "suction cup" end effector may be provided in lieu of the end effector 105, create suction with a face of the door 192, and apply the "downward" force.

Figure 10B:
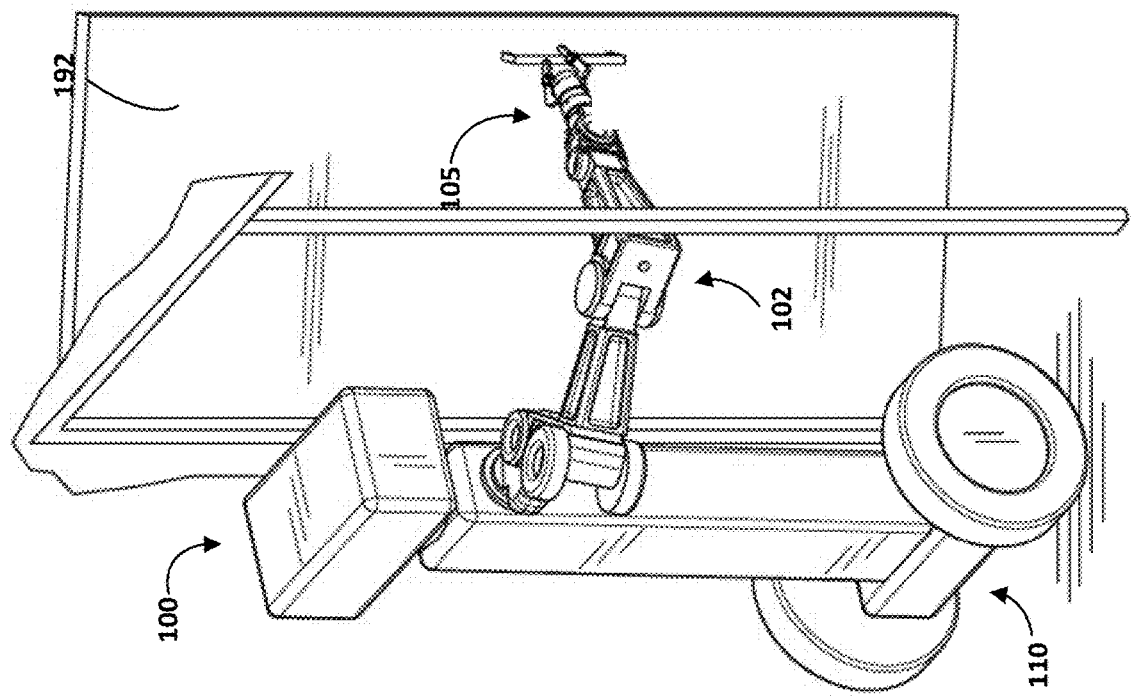
FIG. 10B illustrates the balancing robot of FIG. 1 at a point in time after that of FIG. 10A; the balancing robot is opening the door while applying the movement force to the door.
Figure 10A:
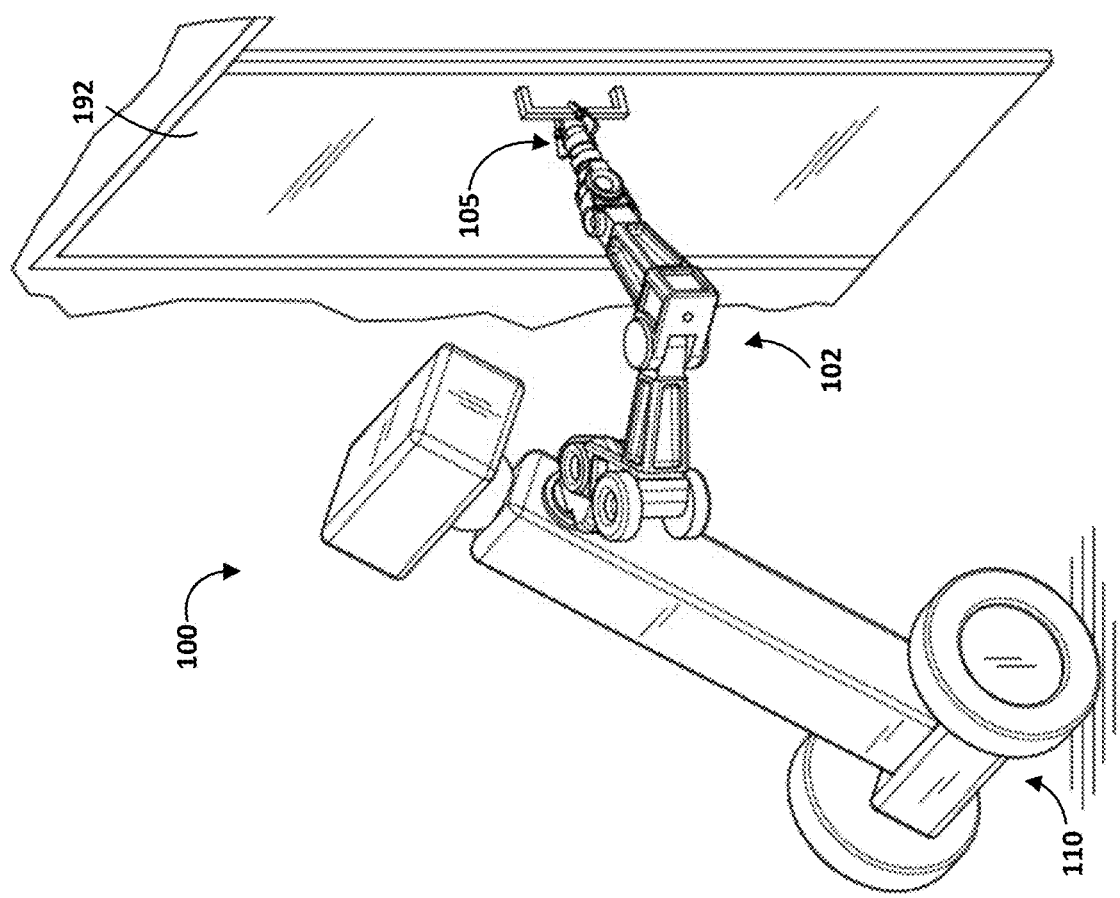
FIG. 10A illustrates the balancing robot of FIG. 1 in a counteracting out of balance state prior to opening a door by applying a movement force to the door.

In some implementations, the balancing robot 100 may additionally or alternatively go into a counteracting out of balance state (e.g., lean forward or lean backward) in advance of a movement force to counteract one or more disturbances to the balancing base 110 that will occur as a result of application of the movement force by the balancing robot 100. One example is illustrated in FIGS. 10A and 10B. FIG. 10A illustrates the balancing robot 100 in a counteracting out of balance state prior to opening the door 192 by applying a movement force to the door 192. FIG. 10B illustrates the balancing robot 100 opening the door 192 while applying the movement force to the door 192. The counteracting out of balance state of FIG. 10A may counteract disturbances to the balancing base 110 that will occur as a result of initial application of the movement force by the balancing robot 100—and that occur prior to the moment of inertia of the door 192 being exceeded. In some implementations, the technique illustrated in FIGS. 10A and 10B may be utilized to counteract disturbances that occur prior to the moment of inertia of the door 192 being exceeded. In some of those implementations, the technique illustrated in FIGS. 9A and 9B may be utilized in combination to counteract disturbances that occur after the moment of inertia of the door 192 is exceeded (e.g., by applying to the door 192 a counteracting force that is toward the floor).

Figure 8:
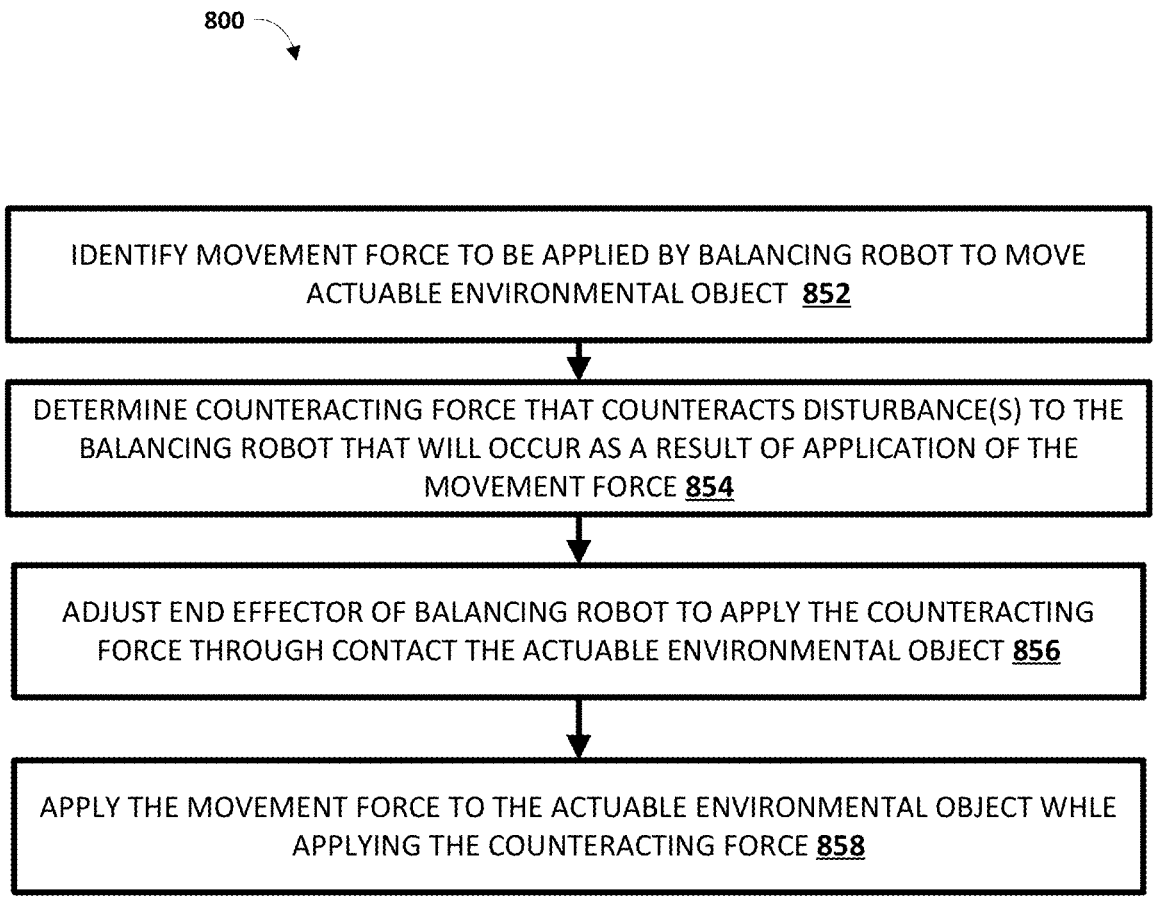
FIG. 8 is a flowchart illustrating an example method of mitigating the risk that a balancing robot will fall when interacting with actuable environmental objects and/or lessening the disturbance to a balancing base when interacting with actuable environmental objects.

FIG. 8 is a flowchart illustrating an example method 800 of mitigating the risk that a balancing robot will fall when interacting with actuable environmental objects and/or lessening the disturbance to a balancing base when interacting with actuable environmental objects. For convenience, the operations of the flow chart are described with reference to a system that performs the operations. This system may include, for example, one or more processors of a robot (e.g., balancing robot 100), such as one or more processors implementing all or aspects of control system 160. Moreover, while operations of method 800 are shown in a particular order, this is not meant to be limiting. One or more operations may be reordered, omitted or added.

At block 852, the system identifies a movement force to be applied by a balancing robot to move an actuable environmental object. For example, to pull open a door the system may identify a movement force that is in a direction toward the balancing robot relative to the door.

At block 854, the system determines a counteracting force that counteracts one or more disturbances to the balancing robot that will occur as a result of application of the movement force.

At block 856, the system adjusts the end effector of the balancing robot to apply the counteracting force through contact with the environmental object. For example, in pulling open a door the system may apply an "upward" counteracting force to the door to mitigate tipping back that may occur once the moment of inertia of the door is exceeded.

At block 858, the system applies the movement force to the actuable environmental object while also applying the counteracting force.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method performed by one or more processors of a robot having a base and an end effector, the method comprising:
    identifying a movement force to be applied, by the robot, to an actuable environmental object to move the actuable environmental object from a current pose to a modified pose;
    determining, based on the movement force to be applied, a counteracting force that counteracts the movement force;
    adjusting the end effector of the robot to apply the counteracting force to the actuable environmental object through contact with the actuable environmental object; and
    while applying the counteracting force, applying the movement force to the actuable environmental object.

2. The method of claim 1, wherein the actuable environmental object is a door.

3. The method of claim 2, wherein the end effector is a grasping end effector and wherein adjusting the end effector to contact the actuable environmental and apply the counteracting force to the actuable environmental object comprises:
    adjusting the grasping end effector to contact a protruding member of the door and applying the counteracting force via the contact with the protruding member.

4. The method of claim 3, wherein the protruding member is a handle or a knob.

5. The method of claim 1, wherein the movement force is a pushing force and wherein determining the counteracting force comprises:
    determining, based on the movement force being the pushing force, the counteracting force to have a direction that is toward the ground.

6. The method of claim 1, wherein the movement force is a pulling force and wherein determining the counteracting force comprises:
    determining, based on the movement force being the pulling force, the counteracting force to have a direction that is away from the ground.

7. The method of claim 1, wherein the counteracting force is applied initially without application of the counteracting force, and wherein applying the movement force occurs after the initial application of the counteracting force and while continuing to apply the counteracting force.

8. The method of claim 1, further comprising:
    while applying the counteracting force and the movement force to the actuable environmental object, iteratively increasing magnitudes of the counteracting force and the movement force.

9. The method of claim 8, further comprising maintaining the magnitudes of the counteracting force and the movement force responsive to determining the actuable member has started to actuate.

10. The method of claim 1, further comprising:
    determining, while applying the counteracting force and the movement force, that a moment of inertia of the actuable environmental object has been exceeded; and
    responsive to determining that the moment of inertia has been exceeded, applying an alternative counteracting force to the actuable environmental object.

11. The method of claim 10, wherein the alternative counteracting force is opposed, in direction, to the counteracting force.

12. The method of claim 11, wherein determining that the moment of inertia has been exceeded is based on sensor data from an inertial measurement unit of the robot.

13. The method of claim 1, wherein the robot is a balancing robot and the base is a balancing base.

14. The method of claim 13, wherein the balancing robot is in a balanced state during at least part of the time that the counteracting force is applied to the actuable environmental object.

15. The method of claim 13, wherein the balancing robot is in a counteracting out of balance state during at least part of the time that the counteracting force is applied to the actuable environmental object, and wherein determining the counteracting force is further based on the counteracting out of balance state.

16. A method performed by one or more processors of a balancing robot having a balancing base and an end effector, the method comprising:
    identifying a movement force to be applied, by the robot, to an actuable environmental object to move the actuable environmental object from a current pose to a modified pose;
    determining, based on the movement force to be applied, a counteracting force that counteracts the movement force;
    adjusting the balancing base of the balancing robot based on the counteracting force, wherein adjusting the balancing base of the balancing robot based on the counteracting force comprises causing the balancing base to be in a counteracting out of balance state that is based on the counteracting force; and
    while in the counteracting out of balance state, causing the robot to apply the movement force to the actuable environmental object.

17. A balancing robot, comprising:
    a balancing base;
    an end effector;
    one or more processors executing instructions, stored in memory of the balancing robot, to:
        identify a movement force to be applied to an actuable environmental object to move the actuable environmental object from a current pose to a modified pose;

determine, based on the movement force to be applied, a counteracting force that counteracts the movement force;

adjust the end effector of the robot to apply the counteracting force to the actuable environmental object through contact with the actuable environmental object; and while applying the counteracting force, apply the movement force to the actuable environmental object.

18. The method of claim 17, wherein the counteracting force is applied initially without application of the counteracting force, and wherein in applying the movement force one or more of the processors are to apply the movement force after the initial application of the counteracting force and while continuing to apply the counteracting force.

19. The balancing robot of claim 18, wherein the one or more processors, in executing the instructions, are further to:

determine, while applying the counteracting force and the movement force, that a moment of inertia of the actuable environmental object has been exceeded; and responsive to determining that the moment of inertia has been exceeded, apply an alternative counteracting force to the actuable environmental object.

20. The balancing robot of claim 19, wherein the actuable environmental object is a door.

* * * * *